United States Patent
Hatayama et al.

(10) Patent No.: US 9,819,838 B2
(45) Date of Patent: Nov. 14, 2017

(54) AUTOMATIC DOCUMENT FEEDING DEVICE AND IMAGE FORMING APPARATUS INCORPORATING SAME

(71) Applicants: Koji Hatayama, Kanagawa (JP);
Takayuki Andoh, Kanagawa (JP);
Tatsuaki Nagano, Kanagawa (JP);
Kaoru Tada, Kanagawa (JP);
Munekazu Hirata, Kanagawa (JP);
Kazushige Kawamura, Kanagawa (JP);
Toshiyuki Horikawa, Kanagawa (JP);
Takuji Kawai, Kanagawa (JP); Yohei Osanai, Kanagawa (JP); Yasunobu Youda, Kanagawa (JP)

(72) Inventors: Koji Hatayama, Kanagawa (JP);
Takayuki Andoh, Kanagawa (JP);
Tatsuaki Nagano, Kanagawa (JP);
Kaoru Tada, Kanagawa (JP);
Munekazu Hirata, Kanagawa (JP);
Kazushige Kawamura, Kanagawa (JP);
Toshiyuki Horikawa, Kanagawa (JP);
Takuji Kawai, Kanagawa (JP); Yohei Osanai, Kanagawa (JP); Yasunobu Youda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/171,009

(22) Filed: Jun. 2, 2016

(65) Prior Publication Data
US 2016/0360073 A1 Dec. 8, 2016

(30) Foreign Application Priority Data
Jun. 2, 2015 (JP) .................................. 2015-112446

(51) Int. Cl.
*H04N 1/60* (2006.01)
*H04N 1/00* (2006.01)
(Continued)

(52) U.S. Cl.
CPC ............. *H04N 1/6075* (2013.01); *B65H 5/06* (2013.01); *B65H 7/20* (2013.01); *H04N 1/0032* (2013.01);
(Continued)

(58) Field of Classification Search
None
See application file for complete search history.

(56) References Cited

U.S. PATENT DOCUMENTS 7,917,060 B2 * 3/2011 Miura ................ G03G 15/0131
347/116
2002/0176121 A1 * 11/2002 Takei ................ H04N 1/1013
358/497
(Continued)

FOREIGN PATENT DOCUMENTS

| JP | 2010-034932 | 2/2010 |
| JP | 2011-259509 | 12/2011 |
| JP | 2013-247595 | 12/2013 |

*Primary Examiner* — Ted Barnes
(74) *Attorney, Agent, or Firm* — Harness, Dickey & Pierce, P.L.C.

(57) ABSTRACT

An automatic document feeding device includes a conveyance unit, an image reading unit, a color reference member, a moving assembly, and a drive source. The drive source includes a rotation output shaft to drive the conveyance unit and the moving assembly. The drive source changes the rotation output shaft from a forward rotation direction to a reverse rotation direction to reversely rotate the rotation output shaft to a set reverse rotation angle set in advance, according to a condition of conveyance of the document. In a rotation transmission route from the rotation output shaft to the moving assembly, the movement regulator is disposed (Continued)

in a first reverse rotation drive region from when a rotation direction of the rotation output shaft is changed to the reverse rotation direction to when a rotation angle of the rotation output shaft after the change in the reverse rotation direction reaches the set reverse rotation angle.

13 Claims, 12 Drawing Sheets

(51) Int. Cl.
  *B65H 5/06* (2006.01)
  *B65H 7/20* (2006.01)
(52) U.S. Cl.
  CPC ....... *H04N 1/0057* (2013.01); *B65H 2211/00* (2013.01); *H04N 2201/0094* (2013.01)

(56) References Cited

U.S. PATENT DOCUMENTS

| | | | | |
|---|---|---|---|---|
| 2003/0094562 A1* | 5/2003 | Takei | ............... | H04N 1/0057 250/208.1 |
| 2003/0094751 A1* | 5/2003 | Takei | ............... | H04N 1/0057 271/276 |
| 2007/0285739 A1* | 12/2007 | Nakano | ............. | H04N 1/00013 358/474 |
| 2008/0074716 A1* | 3/2008 | Yoshihisa | ......... | H04N 1/00912 358/497 |
| 2008/0123163 A1* | 5/2008 | Nakano | ............. | H04N 1/00681 358/498 |
| 2010/0027081 A1* | 2/2010 | Sano | ................ | H04N 1/00588 358/498 |
| 2015/0341515 A1 | 11/2015 | Youda et al. | | |

\* cited by examiner

AUTOMATIC DOCUMENT FEEDING DEVICE AND IMAGE FORMING APPARATUS INCORPORATING SAME

CROSS-REFERENCE TO RELATED APPLICATION

This patent application is based on and claims priority pursuant to 35 U.S.C. §119(a) to Japanese Patent Application No. 2015-112446, filed on Jun. 2, 2015, in the Japan Patent Office, the entire disclosure of which is hereby incorporated by reference herein.

BACKGROUND

Technical Field

Embodiments of this disclosure relate to an automatic document feeding device and an image forming apparatus, and in particular, relates to an automatic document feeding device that secures an image reading position and conveys a document to the image reading position, and an image forming apparatus including the automatic document feeding device.

Related Art

Conventionally, automatic document feeding devices that automatically convey documents along a conveyance route that passes through an image reading position, which is so-called sheet-through-type document conveyance and document reading, and image forming apparatuses such as copiers equipped with the aforementioned automatic document feeding devices are frequently used.

In such automatic document feeding devices and image forming apparatuses, to suppress variation in image colors caused by light source unevenness or sensitivity unevenness of image sensors, shading correction is periodically executed based on read image data of a white reference face.

SUMMARY

In an aspect of the present disclosure, there is provided an automatic document feeding device that includes a conveyance unit, an image reading unit, a color reference member, a moving assembly, and a drive source. The conveyance unit conveys a document to an image reading position. The image reading unit reads an image of the document. The color reference member faces the image reading unit and includes a white reference face to correct shading. The moving assembly relatively moves the image reading unit and the color reference member. The movement regulator regulates a relative movement of the image reading unit and the color reference member by the moving assembly. The drive source includes a common rotation output shaft to drive the conveyance unit and the moving assembly. The drive source changes the rotation output shaft from a forward rotation direction to a reverse rotation direction to reversely rotate the rotation output shaft to a set reverse rotation angle set in advance, according to a condition of conveyance of the document by the conveyance unit. In a rotation transmission route from the rotation output shaft to the moving assembly, the movement regulator is disposed in a first reverse rotation drive region from when a rotation direction of the rotation output shaft is changed to the reverse rotation direction to when a rotation angle of the rotation output shaft after the change in the reverse rotation direction reaches the set revere rotation angle. The moving assembly relatively moves the image reading unit and the color reference member in a second reverse rotation drive region where the rotation output shaft is rotated in the reverse rotation direction beyond the set reverse rotation angle.

In another aspect of the present disclosure, there is provided an image forming apparatus that includes the automatic document feeding device, an image forming unit, and a controller. The image forming unit is configured to form an external output image based on a read image in the image reading unit of the automatic document feeding device. The controller is configured to rotate the rotation output shaft in the reverse rotation direction beyond the set reverse rotation angle and relatively move the image reading unit and the color reference member, when a number of times of image formation in the image forming unit reaches a period corresponding to a number of times of shading correction requests set in advance, and to execute the shading correction of the image formed in the image forming unit using the color reference member including the white reference face for the shading correction.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
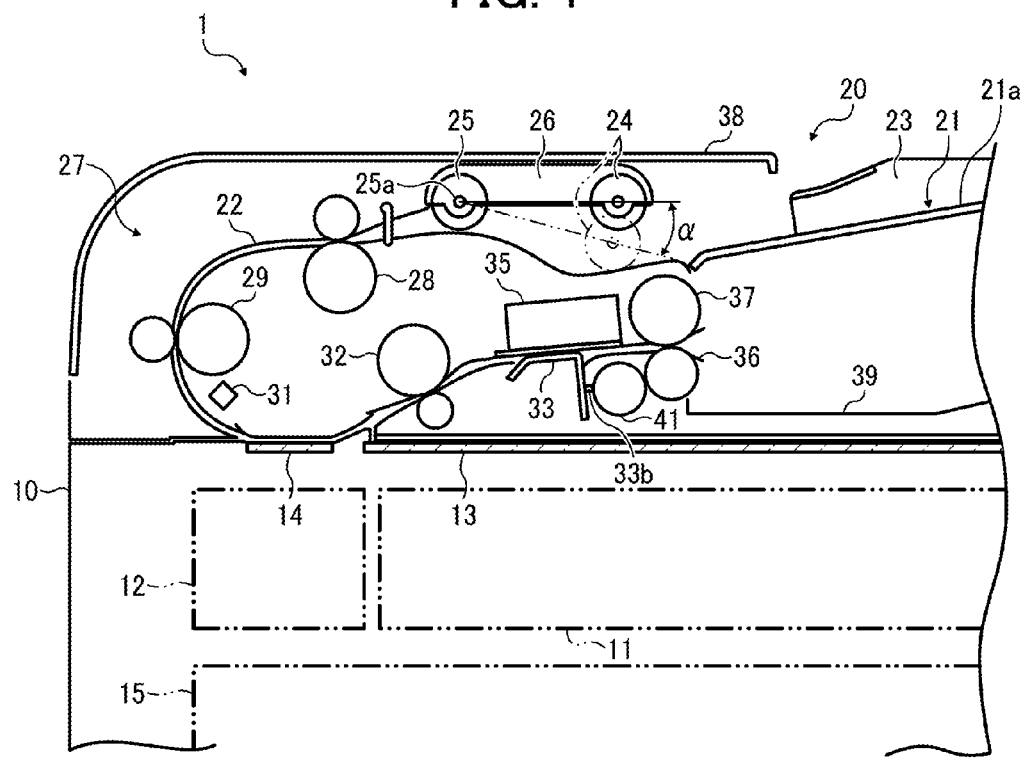
FIG. 1 is a schematic front cross-sectional view of a main part of an automatic document feeding device and an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments for implementing the present disclosure will be described with reference to the drawings.

First Embodiment

FIGS. 1 to 10 illustrate a first embodiment of the present disclosure.

The present embodiment is one obtained by applying an automatic document feeding device of the present disclosure to an image forming apparatus of an arbitrary type such as an electrophotographic type or an inkjet recording type, for example, a document image reading section of a digital multifunction peripheral 1 illustrated in FIG. 1.

The digital multifunction peripheral 1 illustrated in FIG. 1 has functions of a copier, a printer, a facsimile machine, a scanner, and the like, and can output and record a full color image or a monochromatic image onto a recording sheet based on input data such as read image data, and can output the full color image or the monochromatic image in a predetermined data format. Note that the automatic document feeding device and the image forming apparatus of the present disclosure may just exert an image reading function for conveyed document.

Figure 2:
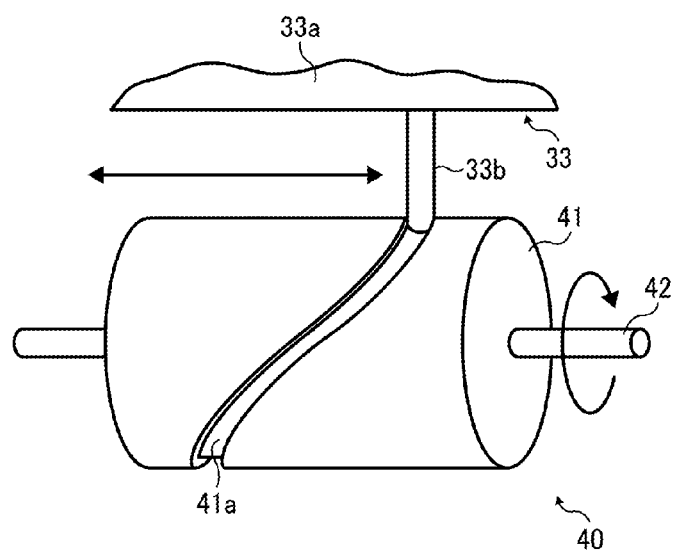
FIG. 2 is a schematic perspective view of a cam assembly for relatively moving a color reference member and an image reading unit in the automatic document feeding device according to the first embodiment of the present disclosure.

As illustrated in FIGS. 1 and 2, the digital multifunction peripheral 1 includes an apparatus body 10 including a sheet feeding unit, image reading units 11 and 12, and an image forming unit 15, and an automatic document feeder (ADF) 20 that is an automatic document feeding device above the apparatus body 10. The image reading units 11 and 12 of the apparatus body 10 and the ADF 20 as a whole configure an image reading device 5.

The sheet feeding unit of the apparatus body 10 includes a plurality sheet feeding trays where cut-sheet recording sheets are respectively stored, and a plurality of sets of sheet feeding rollers that pick up the recording sheet from an arbitrary sheet feeding tray of the sheet feeding trays and feed the recording sheet. Further, the sheet feeding unit includes a sheet feeding path including various types of rollers that convey the recording sheet fed by any of the sheet feeding rollers to a predetermined image forming position of the image forming unit.

The image forming unit 15 of the apparatus body 10 includes, for example, an exposure unit, a plurality of photoconductor drums, a developing device using toners of four colors including cyan (C), magenta (M), yellow (Y), and black (K), a transfer belt, a secondary transfer unit, a fixing unit, and the like.

This image forming unit 15 exposes photoconductor drums of the respective colors by the exposure unit and forms electrostatic latent images on the respective photoconductor drums based on read image in the image reading device 5, and supplies the toners to latent image bearers on the photoconductor drums by developing units of the respective colors of the developing device and develops toner images. Further, the image forming unit 15 primarily transfers the toner images on the photoconductor drums of the respective colors onto the transfer belt, secondarily transfers the toner images on the recording sheet in the secondary transfer unit, and fixes the toner image on the recording sheet by heating and pressing the toner image by the fixing unit, thereby to form a color image. Further, the image forming unit can form externally output images such as an image file and data outputtable to an outside based on the read image in either the image reading unit 11 or 12, or a back image reading module 35 (image reading unit) described below.

The image reading device 5 can be switchable to a flatbed scanner mode (mounted document reading mode) and a DF scanner mode (conveyed document reading mode).

The flatbed scanner mode is an operation mode, which is executed when a read start request operation is made, such as pressing of a copy start key, in a state where a document is mounted on a flatbed exposure glass 13 at an upper portion of the apparatus body 10, and in which an image of the mounted document is read. Further, the DF scanner mode is an operation mode in which the image of the conveyed document is read by the image reading unit 12 adjacent to the image reading unit 11 during automatic conveyance of the document by the ADF 20.

The image reading unit 11 irradiates an image surface of the document on the flatbed exposure glass 13 with light in the flatbed scanner mode. The image reading unit 11 then reads the image of the document by converting reflection light from the image surface of the document into an image signal.

The ADF 20 separates document sheets from a document sheet bundle mounted on the document mount tray 21 (document mount table) sheet by sheet, conveys the document sheet into a document conveyance path 22, and conveys the document sheet along the document conveyance path 22, in the DF scanner mode. During the conveyance, the document sheet partially and sequentially faces an upper surface of a DF exposure glass 14 from an upstream side in a conveyance direction.

The image reading unit 12 is arranged below the DF exposure glass 14.

This image reading unit 12 is a known DF scanner that repeatedly performs line scanning of a surface-side image of the document at a predetermined image reading position on the DF exposure glass 14 and can read the image. The image reading unit 12 may use a part of the image reading unit 11.

The ADF 20 is attached to an upper-side rear portion (a back-side portion) of the apparatus body 10 through an opening/closing mechanism such as a hinge. Further, the ADF 20 can take an open position where the flatbed exposure glass 13 is opened, and a closed position where the document on the flatbed exposure glass 13 is pressable, with respect to the apparatus body 10.

In the document mount tray 21, right and left movable side guide plates 23 are attached, which position the document sheet set in the ADF 20 in a sheet width direction, which is perpendicular to a sheet feeding direction. These side guide plates 23 can relatively come close and separate so that the document mount tray 21 and the center of the document sheet in the width direction are matched. Note that the side guide plates 23 may be ones arranged to make one end of the document sheet be in contact with one end side of the document mount tray 21, and to move only the other end side of the document sheet.

The ADF 20 is covered with a cover 38 with at least an upper portion openable/closeable. This cover 38 covers an upper portion near a sheet feeding-side end of the document mount tray 21 so that leading ends of the document sheets come under the cover 38. Further, a principle guide that forms the document conveyance path 22 of the ADF 20 is formed of a rib and the like formed in the cover 38.

Meanwhile, the ADF 20 includes a call roller 24 that calls the document set on the document mount tray 21 to the sheet feeding direction, and a feed roller 25 and a separation belt for sending the document called with the call roller 24 in the sheet feeding direction toward the document conveyance path 22.

Further, the ADF 20 includes a conveyance unit 27 that conveys the document, which has been fed by the feed roller 25 into the document conveyance path 22, onto the DF exposure glass 14 in a posture at which the image is readable, and conveys the document after the image is read, to an ejection port 36.

This conveyance unit 27 reverses the document sheet separated/conveyed with the feed roller 25 and the like to be folded along the document conveyance path 22, and conveys the document sheet to pass through a predetermined reading position on an upper surface of the DF exposure glass 14. For such document conveyance, a plurality of conveyance rollers 28 and 29, and a registration sensor 31 that detects the leading end of the document sheet in the conveyance direction are provided at an upstream side of the DF exposure glass 14 in the document conveyance path 22.

A sheet of paper separated by the feed roller 25 and the like is conveyed to pass through over the DF exposure glass 14 with the conveyance rollers 28 and 29, and the surface image of the document is read by the image reading unit 12 at appropriate timing based on a leading end detection timing of the document by the registration sensor 31.

For example, when the leading end of the document is detected by the registration sensor 31, timing when the position of the leading end of the document detectable with a pulse count of a sheet feeding-and-conveyance motor 51 that is a drive source reaches the reading position on the DF exposure glass 14 is identified. Then, a gate signal that indicates an effective image region of the surface of the document in the sub-scanning direction begins to be transmitted from a controller 100 of the ADF 20 to a controller 111 of the apparatus body 10, and the gate signal is continuously transmitted until a position of a trailing end of the document passes through the reading position.

When reading of a back image of the document is requested, the back image is read by a back image reading module 35 (image reading unit) made of a contact image sensor for reading a back surface.

The back image reading module 35 includes a light source that irradiates the document with light based on a lighting signal from the controller 100, a plurality of sensor chips, each of which receives reflection light from the document, and a plurality of amplifiers, each of which amplifies a signal output from each of the sensor chips. The back image reading module 35 further includes an analog/digital (AD) converter that converts the signal amplified in the amplifier from an analog signal into a digital signal, and an image processor that applies image processing to the digitally converted signal. Further, the back image reading module 35 includes an output control circuit that performs output control of the signal stored in a frame memory based on a timing signal from the controller 100, an interface circuit that outputs the signal from the output control circuit to the apparatus body 10 side, and the like. Note that a power supply is supplied from the controller 100 of the ADF 20 to the back image reading module 35.

Timing of reading a back image by the back image reading module 35 is also approximately similarly controlled to the timing of reading the surface image, and the document after read is ejected to a document ejection tray 39.

A reading exit roller 32 that conveys the document, the surface image of which has been read, to the back image reading module 35 side is provided at a downstream side of the DF exposure glass 14 in the document conveyance path 22. Further, a white-color guide 33 facing the back image reading module 35, and a sheet ejection roller 37 positioned at a downstream side of the back image reading module 35 and the white-color guide 33 are provided at a downstream side of the reading exit roller 32.

The number of arrangements and arrangement places of the conveyance and ejection rollers can be arbitrarily set according to a path setting condition of the document conveyance path 22, a length of the conveying direction of a minimum-size document, and the like.

The white-color guide 33 has a guide function to move the conveyed document along the back image reading module 35, and includes a white reference face 33a for shading correction arranged to face the back image reading module 35 in the entire main scanning direction.

(Shading Correction)

Here, shading correction using the back image reading module 35 and the white reference face 33a facing the back image reading module 35 will be described.

In the present embodiment, shading correction (adjustment to read the white reference face 33a and suppress color unevenness and the like) is necessarily conducted before reading an image of the first document, and then the shading correction (intermittent shading) is conducted again when a predetermined time has passed during a continuous operation.

In the shading correction, the white reference face 33a of the white-color guide 33 facing the back image reading module 35 and extending in the main scanning direction is read by the back image reading module 35. Then, based on a read value thereof, adjustment of sensitivity of reading the back image in the main scanning direction of the back image reading module 35, the image forming condition in the image forming unit 15, and the like is performed.

At the time of the adjustment for shading correction, when dirt or the like adheres to the white reference face 33a of the white-color guide 33, the adjustment is not correctly performed, and streaks or the like appear on the image.

Therefore, the present embodiment reads a plurality of data while moving the white-color guide 33 in the main scanning direction at the time of shading, thereby to execute stable shading correction, without being affected by the dirt or the like.

A moving direction of the white-color guide 33 may deviate from the main scanning direction. However, the main scanning direction is favorable in terms of holding the posture, moving guide, and the like.

A mechanism to move the white-color guide 33 will be described below.

(Drive of Call Roller and Elevation Assembly)

By the way, the ADF 20 moves the call roller 24 downward to approach the document mount tray 21 when picking up the document sheet at the upstream side of the conveyance unit 27, and brings the call roller 24 to be in contact with the upper surface of the uppermost document sheet of the document bundle.

When the call roller 24 is rotated in the sheet feeding direction, for example, the call roller 24 can perform a so-called calling operation to pull the uppermost document on the document mount tray 21 into the sheet feeding direction. When the operation to read the image of the document is completed, and the document sheet is ejected, the call roller 24 is then moved upward to be separated from the document mount tray 21, and is stopped at a predetermined stand-by position. Accordingly, the call roller 24 can set the next document onto the document mount tray 21.

The call roller 24 is held by a pickup holder 26. This pickup holder 26 is swingably supported by a feed roller shaft 25a in a center of the feed roller 25 through a known both direction torque limiter at a left end side in FIG. 1.

Therefore, when the feed roller shaft 25a in the center of the feed roller 25 is rotated, the pickup holder 26 swings in an up and down direction in FIG. 1 to raise the call roller 24 supported at a right end side in FIG. 1. Further, the call roller 24 is coupled to be rotated in conjunction with the feed roller shaft 25a through an endless belt and a pulley for rotation transmission.

Figure 3:
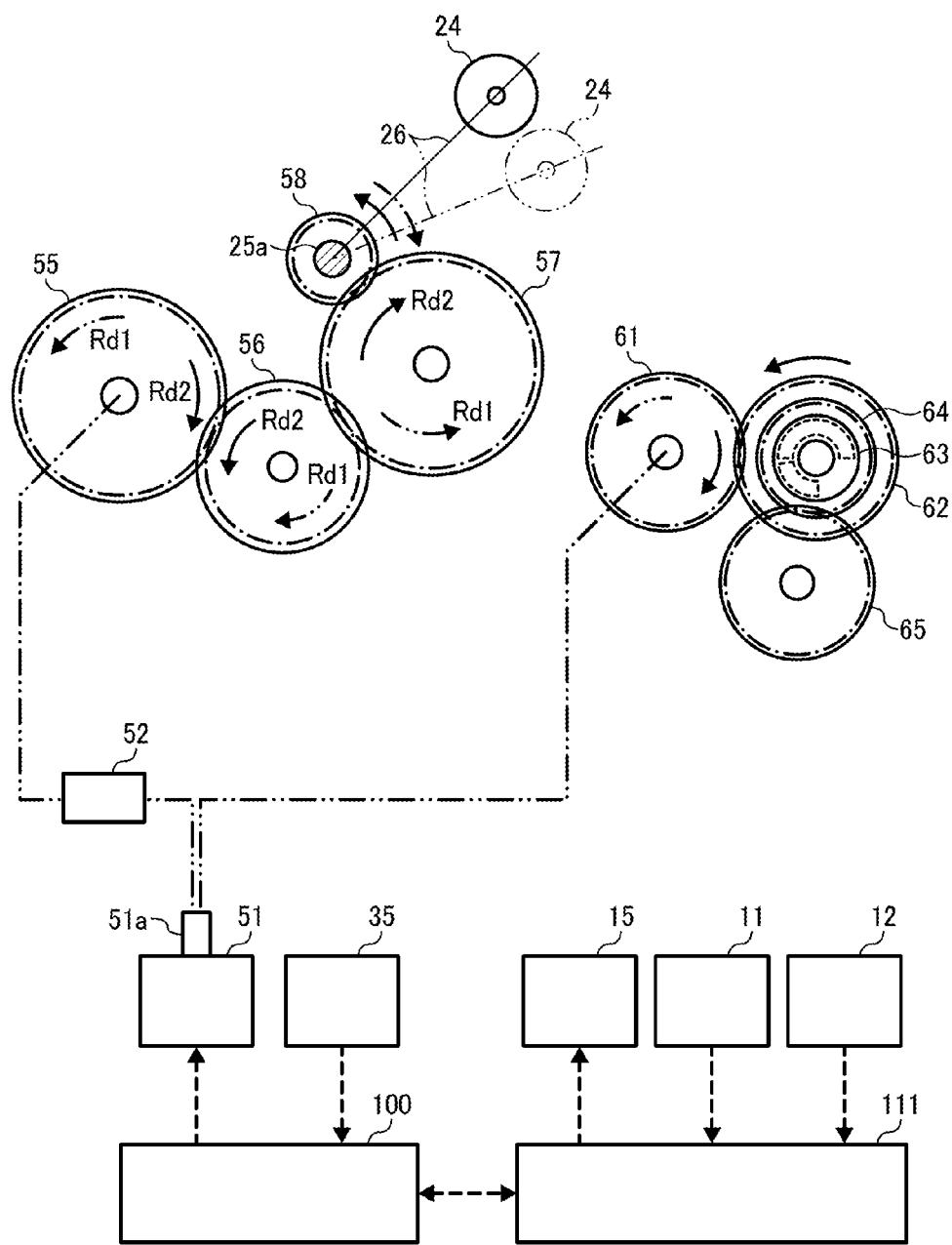
FIG. 3 is an illustration of a drive system illustrating a first drive line that transmits rotation from a sheet feeding-and-conveyance motor in the automatic document feeding device according to the first embodiment of the present disclosure to an elevation assembly of a call roller, and a second drive line that transmits rotation from the sheet feeding-and-conveyance motor to a moving assembly of the color reference member.

The feed roller shaft 25a in the center of the feed roller 25 is driven and rotated by an output shaft 51a (common rotation output shaft) of a sheet feeding-and-conveyance motor 51 (drive source) illustrated in FIG. 3, and performs forward rotation and reverse rotation according to an output rotation direction of the sheet feeding-and-conveyance motor 51. The forward rotation referred to here is rotation of the document sheet in the sheet feeding-and-conveyance direction by the feed roller 25 and the conveyance unit 27, and the reverse rotation is rotation in a direction opposite to the sheet feeding-and-conveyance direction.

When the output rotation direction of the sheet feeding-and-conveyance motor 51 illustrated in FIG. 3 is the forward rotation direction, rotation is transmitted from the sheet feeding-and-conveyance motor 51 to the feed roller shaft 25a in the forward rotation direction illustrated by the broken-line arrow Rd1 in FIG. 3 through rotation transmitters 55, 56, 57, and 58 of a plurality of gears. At that time, the feed roller shaft 25a causes the pickup holder 26 to swing downward to cause the call roller 24 to approach the document mount tray 21.

Meanwhile, when the output rotation direction of the sheet feeding-and-conveyance motor 51 is the reverse rotation direction, rotation in the reverse rotation direction illustrated by the solid-line arrow Rd2 in FIG. 3 is transmitted from the sheet feeding-and-conveyance motor 51 to the feed roller shaft 25a through the rotation transmitter 55, 56, 57, and 58 of a plurality of gears. At that time, the feed roller shaft 25a causes the pickup holder 26 to swing upward to separate the call roller 24 from the document mount tray 21.

The sheet feeding-and-conveyance motor 51, the rotation transmitters 55 to 58, the feed roller shaft 25a, and the pickup holder 26 configure an elevation assembly 30 that raises and lowers the call roller 24 between a lowered position illustrated by the broken line in FIG. 1 and a raised position illustrated by the solid line in FIG. 1.

This elevation assembly 30 lowers the call roller 24 to a document calling position (the lowered position illustrated by the broken line in FIG. 1) where the call roller 24 approaches the document mount surface 21a of the document mount tray 21 and comes in contact with the document, according to the rotation of the output shaft 51a of the sheet feeding-and-conveyance motor 51 in the forward rotation direction. Further, the elevation assembly 30 raises the call roller 24 to a stand-by position (the raised position illustrated by the solid line in FIG. 1) where the call roller 24 is separated from the document mount surface 21a of the document mount tray 21, according to the rotation of the output shaft 51a of the sheet feeding-and-conveyance motor 51 in the reverse rotation direction. Accordingly, a user can set the next document to the document mount tray 21.

The elevation assembly 30 raises the call roller 24 to the stand-by position from a point of time when the sheet feeding-and-conveyance motor 51 changes the output rotation direction to the reverse rotation direction after document ejection to when a reverse rotation angle of the output shaft 51a reaches a set reverse rotation angle corresponding to an elevation angle α in FIG. 1.

When the feed roller shaft 25a is driven in the reverse rotation direction, the pickup holder 26 swings upward and comes in contact with the cover 38. At this time, excessive torque transmission and rotation from the feed roller shaft 25a is interrupted through the above-described both direction torque limiter. Accordingly, the pickup holder 26 stops while being in contact with the cover 38 during the reverse rotation of the sheet feeding-and-conveyance motor 51.

When the feed roller shaft 25a is driven in the forward rotation direction, the pickup holder 26 swings downward, and the call roller 24 comes in contact with the document sheet. At this time, excessive torque transmission and rotation from the feed roller shaft 25a to the pickup holder 26 is interrupted through the both direction torque limiter. Accordingly, the call roller 24 is in contact with the document sheet with predetermined adequate contact pressure during forward rotation driving of the sheet feeding-and-conveyance motor 51.

In the first drive line DL1 that is a transmission route of rotation from the sheet feeding-and-conveyance motor 51 to the feed roller shaft 25a of the feed roller 25, a sheet feeding clutch 52 for switching coupling/non-coupling of the drive side and the driven side.

Then, by appropriately switching ON (coupling, connection)/OFF (non-coupling, interruption) of the sheet feeding clutch 52, a calling period or conveyance interval of the document is controlled.

This sheet feeding clutch 52 controls the rotation of only the feed roller 25 and the call roller 24. The conveyance rollers 28 and 29, the reading exit roller 32, the sheet ejection roller 37, and the like are always rotated in conjunction with the output shaft 51a of the sheet feeding-and-conveyance motor 51.

(Mechanism to Move White-Color Guide)

FIG. 2 illustrates a perspective view of a moving assembly 40 that moves the white reference face 33a of the white-color guide 33 in the main scanning direction.

The moving assembly 40 relatively moves the back image reading module 35 and the white reference face 33a of the white-color guide 33 to an arbitrary one of a first relative position used for the shading correction and a second relative position other than the first relative direction.

The second relative position other than the first relative position is a normal back image reading operation position, and the position of the back image reading module 35 and the position of the white reference face 33a of the white-color guide 33 at this normal back image reading operation time are secured positions.

Meanwhile, at the time of the shading correction of the back image reading system, the position of the white reference face 33a of the white-color guide 33 is changed in the main scanning direction with respect to the position of the back image reading module 35. That is, the first relative position is changed during the shading correction.

The moving assembly 40 includes a projection pin 33b secured to a side wall of the white-color guide 33 by means of caulking or the like, and a cylindrical cam 41 including a spiral cam groove 41a that slidably stores a leading end of the pin 33b.

Further, the moving assembly 40 includes a cam drive shaft 42 integrally joined with a rotation center of the cylindrical cam 41, and a second drive line DL2 that transmits the rotation from the sheet feeding-and-conveyance motor 51 to the cam drive shaft 42 through a plurality of rotation transmitters 61, 62, 63, 64, 65, and 66. The plurality of rotation transmitters 61 to 66 includes gears, for example, and may include a belt and the like.

The sheet feeding-and-conveyance motor 51 that is a drive source includes the common output shaft 51a that can drive the conveyance unit 27 and the moving assembly 40.

Further, the sheet feeding-and-conveyance motor 51 changes the output shaft 51a from the forward rotation direction to the reverse rotation direction, and reversely rotates the output shaft 51a up to the set reverse rotation angle set in advance according to a conveyance condition of the document by the conveyance unit 27.

To be specific, the sheet feeding-and-conveyance motor 51 changes the rotation direction of the output shaft 51a from the forward rotation direction to the reverse rotation direction, immediately after ejection of the documents, or immediately after image reading of all of the documents and ejection are completed (hereinafter, either of the aforementioned timing is simply referred to as immediately after ejection).

In the second drive line DL2 from the sheet feeding-and-conveyance motor 51 to the cam drive shaft 42, a one-way assembly 45 that transmits the rotation in the reverse rotation direction to the cam drive shaft 42 only when the sheet feeding-and-conveyance motor 51 performs the reverse rotation.

Further, in the second drive line DL2, a movement regulator 46 that can regulate relative movement of the back image reading module 35 and the white-color guide 33 by the moving assembly 40, by regulating the rotation transmission from the sheet feeding-and-conveyance motor 51 to the cam drive shaft 42, is provided.

Figure 5:
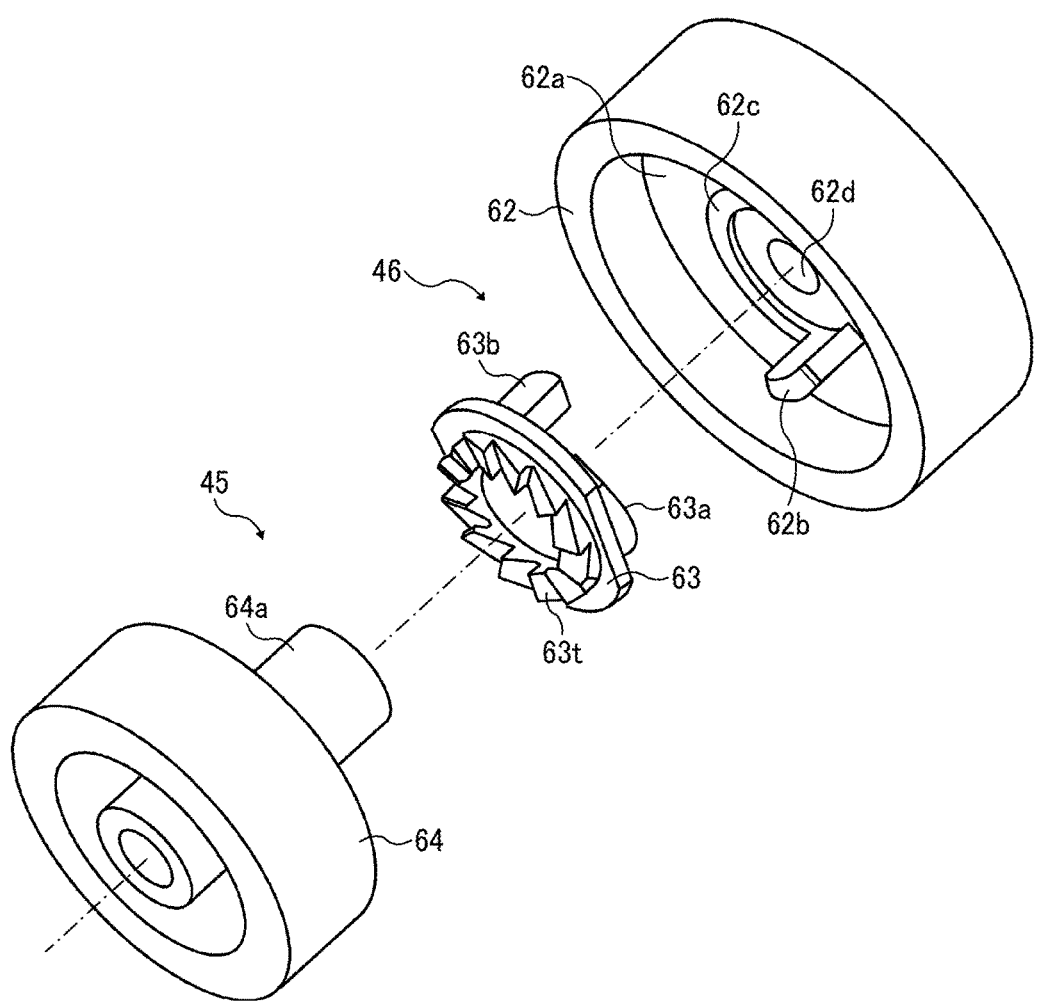
FIG. 5 is an schematic exploded perspective view of a unidirectional transmission assembly with a movement regulator including a collar member and a pair of rotation transmitters arranged in the second drive line in the automatic document feeding device according to the first embodiment of the present disclosure, as viewed from an upper side of a driven-side rotation transmitter.
Figure 6:
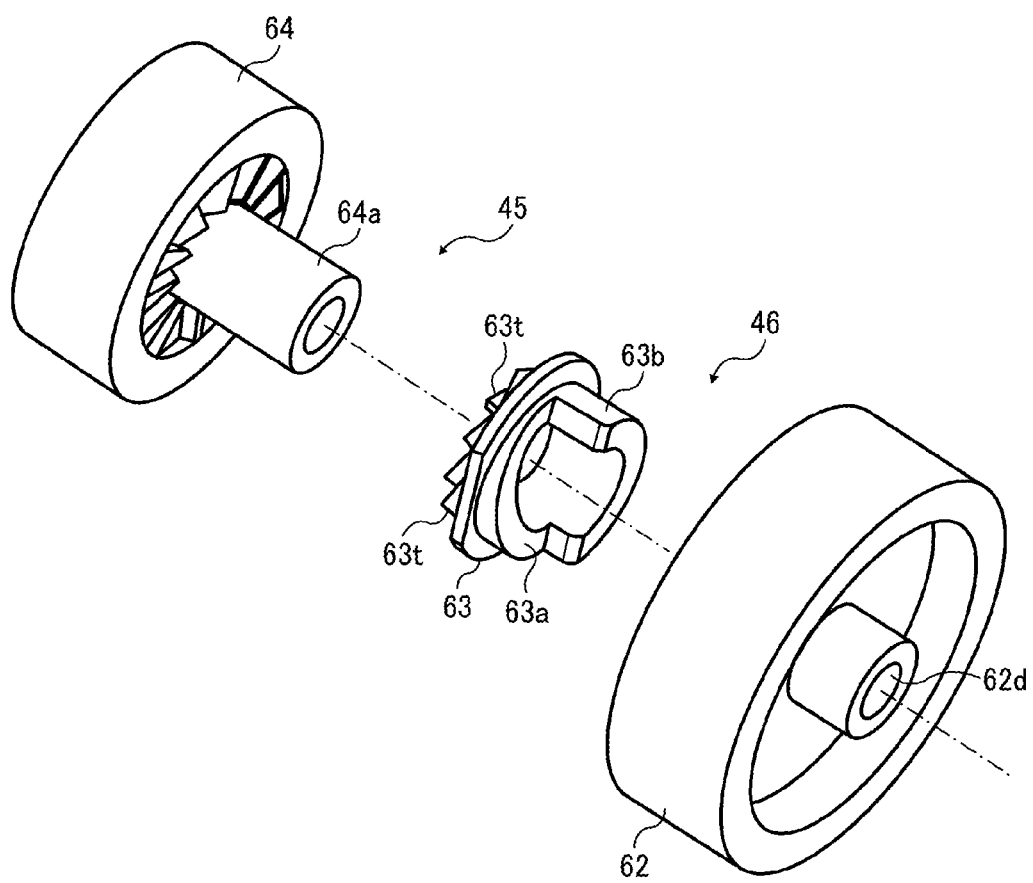
FIG. 6 is a schematic exploded perspective view of the unidirectional transmission assembly with a movement regulator including a collar member and a pair of rotation transmitters arranged in the second drive line in the automatic document feeding device according to the first embodiment of the present disclosure, as viewed from an upper side of a drive-side rotation transmitter.

As illustrated in FIGS. 5 and 6, the one-way assembly 45 regulates the relative rotation direction of a pair of the rotation transmitters 62 and 64 facing in an axial direction to one direction, between the pair of rotation transmitters 62 and 64.

Further, the movement regulator 46 regulates the operation of the moving assembly 40 in a first reverse rotation drive region from a point of time when the rotation of the output shaft 51a of the sheet feeding-and-conveyance motor 51 is changed to the reverse rotation direction to when the rotation angle of the output shaft 51a after the change in the reverse rotation direction reaches the set reverse rotation angle.

To be specific, in the second drive line DL2, the one rotation transmitter 62 is a drive-side member positioned at the sheet feeding-and-conveyance motor 51 side, of the one-way assembly 45. Further, the other rotation transmitter 64 is a driven-side member positioned at the moving assembly 40 side, of the one-way assembly 45. Then, a ringed collar member 63 rotatably supported by a boss 64a of the driven-side rotation transmitter 64 is interposed between the pair of rotation transmitters 62 and 64.

The pair of rotation transmitters 62 and 64 is rotatably supported by a round rod-like common support shaft at respective centers, and movement in the axial direction is regulated such that a mutual clearance in the axial direction becomes constant with respect to the common support shaft.

In the drive-side rotation transmitter 62, a recessed portion 62a that can store the collar member 63, a projecting piece 62b protruding from an inner depth side of the recessed portion 62a to one side in the axial direction, and having an arc-shaped cross section, a ringed projecting portion 62c forming an integral annular shape with the projecting piece 62b, and a rotation support hole 62d are provided.

Figure 10:
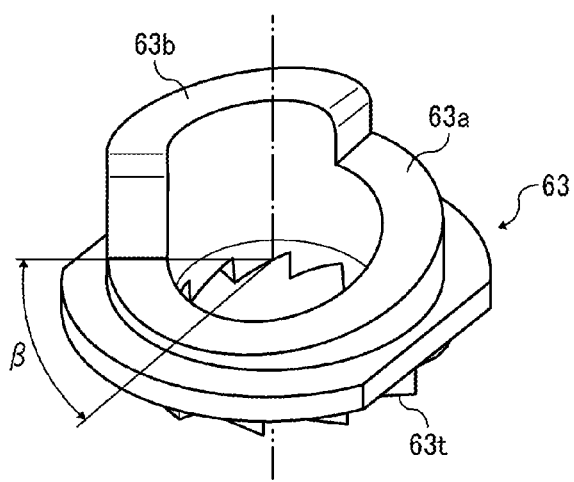
FIG. 10 is a perspective view of the collar member of the unidirectional transmission assembly in the automatic document feeding device according to the first embodiment of the present disclosure, as viewed from the sheet feeding-and-conveyance motor side.

At one end face side of the collar member 63 in the axial direction, an end-face cam portion 63a spirally inclined while facing the projecting piece 62b of the drive-side rotation transmitter 62 in the axial direction, and a stopper 63b having an arc-shaped cross section, and stoppable with respect to the projecting piece 62b at both sides in the rotation direction are provided. Here, as illustrated in FIG. 6, the stopper 63b may be formed in an angle range of about 180 degrees in an approximately semi-cylindrical shape, or may be set to an angle range of less than 180 degrees (for example, about 90 to 120 degrees), as illustrated in FIG. 10.

Further, blade-like ratchet gears 63t and 64t that engageably face each other in the axial direction, and regulate a relative rotation direction to one direction at the time of engagement are provided at the other end face side of the collar member 63 in the axial direction and one side of the driven-side rotation transmitter 64 facing the collar member 63.

The stopper 63b of the collar member 63 is a first engagement portion engageable with and detachable from the projecting piece 62b of the drive-side rotation transmitter 62 in the rotation direction. Further, the ratchet gear 63t of the collar member 63 is a second engagement portion to engage the ratchet gear 64t of the driven-side rotation transmitter 64 to allow rotation transmission only in the reverse rotation direction.

Figure 4:
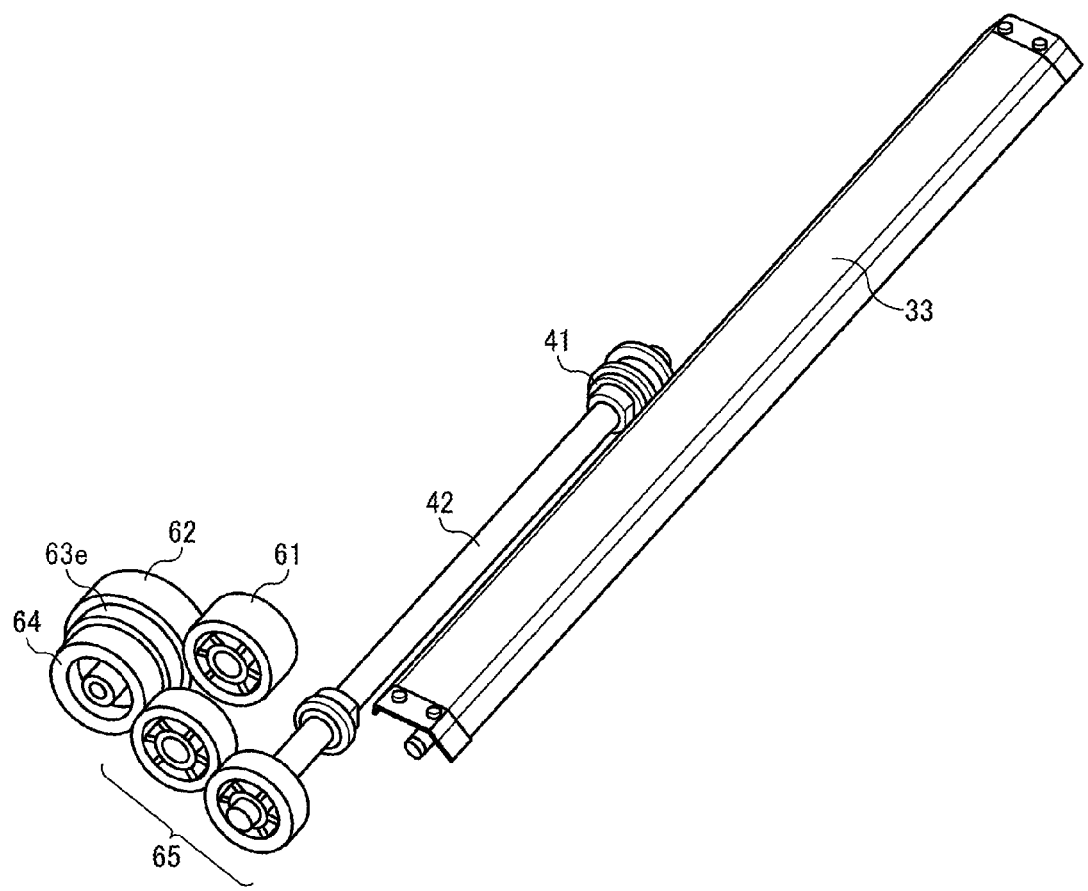
FIG. 4 is a schematic perspective view illustrating the second drive line and the color reference member in the automatic document feeding device according to the first embodiment of the present disclosure.

Although illustration is omitted in FIGS. 5 and 6, the collar member 63 may include a ringed protection wall 63e that surrounds a stopper 63b and a ratchet gear 63t, as illustrated in FIG. 4.

The one-way assembly 45 includes the boss 64a and the ratchet gear 64t of the driven-side rotation transmitter 64, and the end-face cam portion 63a and the ratchet gear 63t of the collar member 63. Accordingly, the one-way assembly 45 can regulate the relative rotation direction of the collar member 63 and the driven-side rotation transmitter 64 to one direction.

The movement regulator 46 includes the projecting piece 62b of the drive-side rotation transmitter 62, the ringed projecting portion 62c, the boss 64a of the driven-side rotation transmitter 64, and the stopper 63b of the collar member 63.

That is, the movement regulator 46 is relatively rotatable within a delay angle β set in advance with respect to the drive-side rotation transmitter 62 at the output shaft 51a side, and allows rotation transmission only in the reverse rotation direction with respect to the driven-side rotation transmitter 64 at the moving assembly 40 side.

The delay angle β referred to here is an angle corresponding to the elevation angle α of the pickup holder 26, and is an angle corresponding to the first reverse rotation drive region from the point of time when the rotation of the output shaft 51a is changed to the reverse rotation direction to when the revere rotation angle of the output shaft 51a after the change reaches the set reverse rotation angle.

Note that a deceleration gear assembly 54 that decelerates the rotation from the output shaft 51a side with the rotation transmitters 55 to 58 of a plurality of gears lies in the first drive line DL1. This deceleration gear assembly 54 decelerates an angular speed ω0 of input rotation from the output shaft 51a side to ω0/e1 before reaching the feed roller shaft 25a. Therefore, the set reverse rotation angle becomes an angle obtained by multiplying the elevation angle α by a deceleration ratio e1 (>1) in the deceleration gear assembly 54.

The movement regulator 46 in the second drive line DL2 has a deceleration gear assembly 68 that decelerates the rotation from the output shaft 51a side with the rotation transmitters 61 to 66 of a plurality of gears in the rotation transmission route from the output shaft 51a of the sheet feeding-and-conveyance motor 51 to the moving assembly 40.

This deceleration gear assembly 68 decelerates the angular speed ω0 of the input rotation from the output shaft 51a side to ω0/e2 before reaching the moving assembly 40. Therefore, the set reverse rotation angle becomes an angle obtained by multiplying the delay angle β by a deceleration ratio e2 (>1) in the deceleration gear assembly 68. Therefore, the delay angle β becomes an angle smaller than the set reverse rotation angle.

This delay angle β is set to an angle larger than the elevation angle α of the pickup holder 26 in the elevation assembly 30.

The moving assembly 40 relatively moves the back image reading module 35 and the white-color guide 33 in the second reverse rotation drive region where the output shaft 51a is rotated in the reverse rotation direction beyond the set reverse rotation angle, by the one-way assembly 45 and the movement regulator 46 in the second drive line DL2.

That is, the moving assembly 40 delays the relative movement of the back image reading module 35 and the white-color guide 33 in the first relative position until the reverse rotation of the output shaft 51a reaches the second reverse rotation drive region by the relative rotation of the pair of rotation transmitters 62 and 64 of the movement regulator 46.

If a foreign substance is mixed around the collar member 63, the collar member 63 cannot be moved in a thrust direction between the drive-side rotation transmitter 62 and the driven-side rotation transmitter 64, or the ratchet gears 63t and 64t may bite the foreign substance. Further, grease coated between the collar member 63 and the boss 64a of the driven-side rotation transmitter 64 has high viscosity, and may incur operation failure.

Therefore, as illustrated in FIG. 4, a short cylindrical ringed protection wall 63e is provided at outer periphery of the collar member 63, and principal members of the collar member 63, as illustrated in FIGS. 5 and 6, are integrally formed with an inner periphery of the ringed protection wall 63e. Note that illustration of the ringed protection wall 63e is omitted in FIGS. 5 and 10 for convenience of description.

Next, functions and effects of the present embodiment will be described while rotation output control of the sheet feeding-and-conveyance motor at the time of a sheet feeding-and-conveyance operation and the shading correction in the DF scanner mode will described.

(Sheet Feeding-and-Conveyance Operation in DF Scanner Mode)

When the document is set in the document mount tray 21 and the copy start key is pressed in a state where necessity of the back image reading has been set, the controller 100 of the ADF 20 receives a reading start instruction from the controller 111 of the apparatus body 10, and executes control of the DF scanner mode.

In this case, first, after the sheet feeding clutch 52 is switched to the connection state (ON state), the rotation in the forward rotation direction is output from the sheet feeding-and-conveyance motor 51 that is a drive source. Then, the rotation in the forward rotation direction from the sheet feeding-and-conveyance motor 51 is transmitted to the feed roller shaft 25*a* through the first drive line DL1 as the rotation in the sheet feeding direction.

At this time, first, the call roller 24 is lowered to the document calling position where the call roller 24 comes in contact with the document on the document mount tray 21 by the operation of the elevation assembly 30, and performs the calling operation. That is, the call roller 24 separates the uppermost document sheet from the document sheet bundle mounted on the document mount tray 21, conveys the document sheet to the document conveyance path 22 side, and feeds the document sheet.

Next, the document fed into the document conveyance path 22 is folded along the document conveyance path 22 by the feed roller 25 and the conveyance unit 27, and is then conveyed to the DF exposure glass 14 side. Therefore, the document passing through on the DF exposure glass 14 passes through the predetermined reading position at a predetermined speed while having its surface image face the upper surface of the DF exposure glass 14.

Then, reading of the surface image of the document by the image reading unit 12 is executed based on the leading end detection timing of the document by the registration sensor 31.

Further, in a case where reading of the back image of the document is requested, the document after the surface image is read is conveyed to the back image reading module 35 side by the reading exit roller 32, and a back image reading operation is performed. Further, the document, the back image of which has been read is sequentially ejected to the document ejection tray 39 side by the sheet ejection roller 37.

Figure 7:
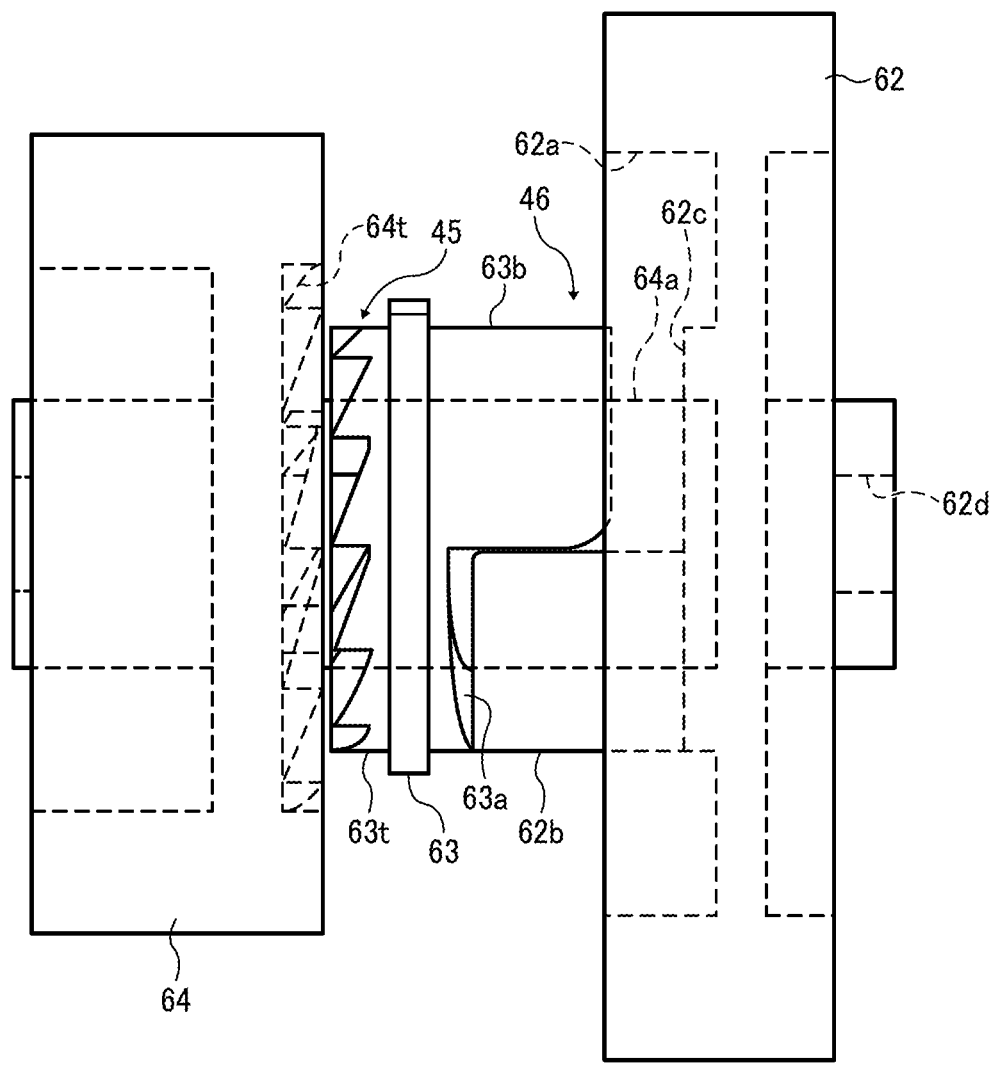
FIG. 7 is a side view illustrating an engagement state of the collar member and the pair of rotation transmitters in the unidirectional transmission assembly of when rotation in a forward rotation direction from the sheet feeding-and-conveyance motor in the automatic document feeding device according to the first embodiment of the present disclosure is input and it becomes a non-transmission state.

During such a series of sheet feeding-and-conveyance operation, in the second drive line DL2, the rotation from the sheet feeding-and-conveyance motor 51 is interrupted by the one-way assembly 45, and cannot be rotation transmitted to the cam drive shaft 42 side, as illustrated in FIG. 7. Therefore, the white-color guide 33 exerts a guide function to move the conveyed document along the back image reading module 35, at a fixed position corresponding to the second relative position.

To be more specific, at the time of the forward rotation of the sheet feeding-and-conveyance motor 51, the drive rotation input to the drive-side rotation transmitter 62 having a gear configuration rotates the driven-side rotation transmitter 64 through the collar member 63. At this time, the ratchet gears 63*t* and 64*t* of the collar member 63 and the driven-side rotation transmitter 64 come in contact with each other on a slope. Therefore, the drive-side rotation transmitter 62 cannot drive the driven-side rotation transmitter 64, the moving assembly 40, and the white-color guide 33 against loads applied to the aforementioned members. Then, the collar member 63 is moved toward the drive-side rotation transmitter 62 in the axial direction, and rotation drive force is not transmitted to the driven-side rotation transmitter 64 (drive is interrupted). Therefore, the drive-side rotation transmitter 62 idles, and the drive-side rotation transmitter 62 and the collar member 63 are co-rotated in a state where the projecting piece 62*b* of the drive-side rotation transmitter 62 and the stopper 63*b* of the collar member 63 butt against each other in the rotation direction, as illustrated in FIG. 7.

Next, when the trailing end of the document passes through the ejection port 36, immediately after that (immediately after document ejection), the rotation direction of the output shaft 51*a* of the sheet feeding-and-conveyance motor 51 is switched from the forward rotation direction to the reverse rotation direction by the controller 100.

Then, the rotation in the reverse rotation direction is output from the output shaft 51*a* of the sheet feeding-and-conveyance motor 51, to the set reverse rotation angle set in advance, from the time of the switching.

At this time, the rotation from the output shaft 51*a* side is transmitted to the feed roller shaft 25*a* while being decelerated, through the plurality of rotation transmitters 55 to 58 in the first drive line DL1. Therefore, the pickup holder 26 is rotated upward by the elevation angle α that is a deceleration rotation angle corresponding to the set reverse rotation angle, and the call roller 24 is moved to the stand-by position where the next document can be set in accordance with the rotation of the pickup holder 26.

As described above, the call roller 24 rises to the stand-by position from the point of time when the sheet feeding-and-conveyance motor 51 changes the output rotation direction after document ejection to the reverse rotation direction to when the reverse rotation angle of the output shaft 51*a* reaches the set reverse rotation angle corresponding to the elevation angle α in FIG. 1.

Meanwhile, the rotation transition from the sheet feeding-and-conveyance motor 51 to the cam drive shaft 42 is temporarily interrupted by the movement regulator 46 in the second drive line DL2 from the point of time of switching of the rotation direction of the output shaft 51*a* to when the sheet feeding-and-conveyance motor 51 is reversely rotated and driven to the set reverse rotation angle.

Figure 8:
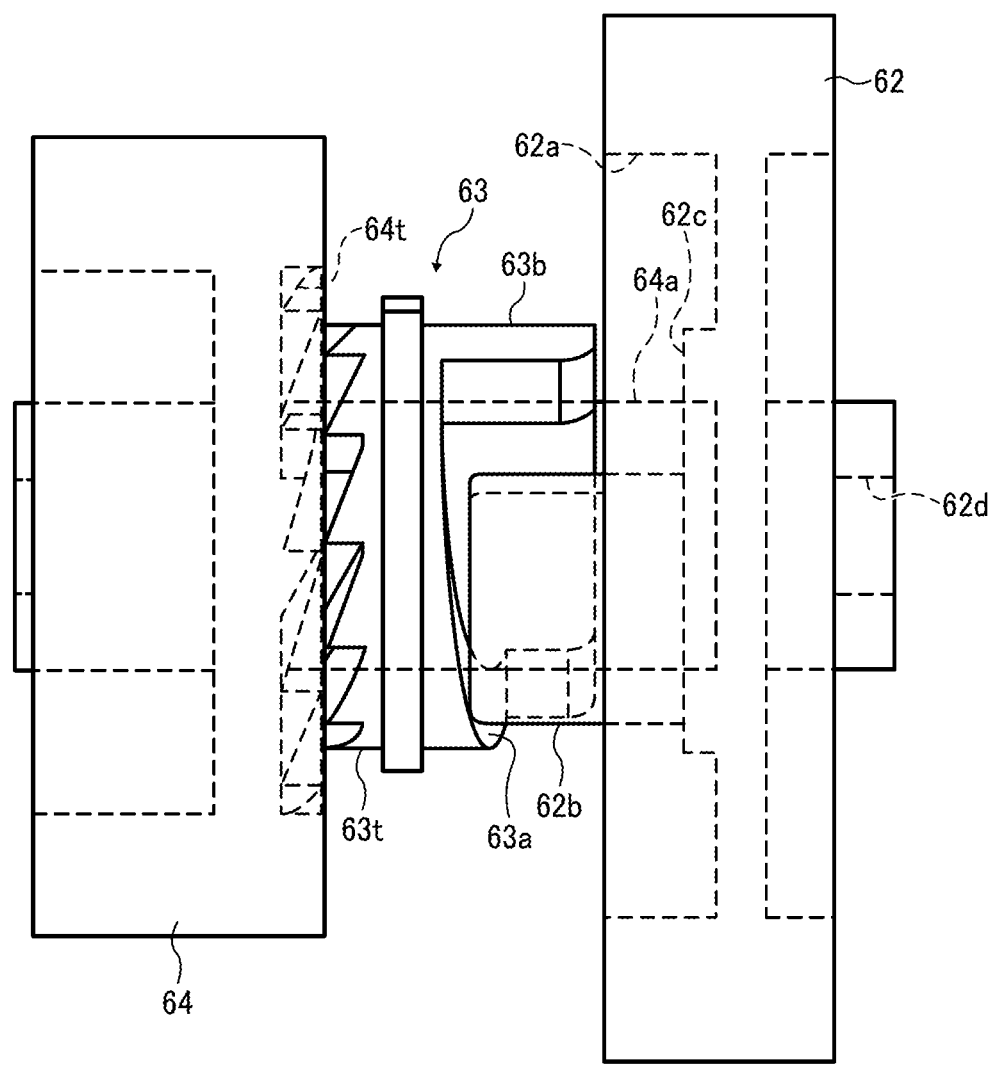
FIG. 8 is a side view illustrating a switching half-way state of the collar member and the pair of rotation transmitters of the unidirectional transmission assembly, which are switched during a delay period from when the sheet feeding-and-conveyance motor in the automatic document feeding device according to the first embodiment of the present disclosure is switched to reverse rotation to when drive of the color reference member by the moving assembly becomes available.

To be specific, even if the rotation from the sheet feeding-and-conveyance motor 51 is transmitted to the drive-side rotation transmitter 62, the projecting piece 62*b* of the drive-side rotation transmitter 62 is detached from one end face of the stopper 63*b* of the collar member 63, against which the projecting piece 62*b* has butted in the forward rotation direction, as illustrated in FIG. 8. Further, until the rotation angle of the sheet feeding-and-conveyance motor 51 in the reverse rotation direction reaches the set reverse rotation angle, the projecting piece 62*b* of the drive-side rotation transmitter 62 does not butt against the other end face of the stopper 63*b* of the collar member 63, and the drive-side rotation transmitter 62 is relatively rotated with the collar member 63 within the delay angle β.

Therefore, although the sheet feeding-and-conveyance motor 51 is reversely rotated and driven to the set reverse rotation angle, the rotation transmission from the sheet feeding-and-conveyance motor 51 to the cam drive shaft 42 is interrupted, and the moving assembly 40 does not relatively move the back image reading module 35 and the white-color guide 33. Therefore, the guide function of the white-color guide 33 at the fixed position is stably secured.

At timing of ON of the power supply of the digital multifunction peripheral 1, restoration from power saving, opening/closing of the ADF 20 (platen), and after opening/closing of the sheet feeding cover (paper jam processing, maintenance, or the like), whether the call roller 24 is in the raised position or in the lowered position is not determined. Therefore, the raising operation of the call roller 24 is necessarily conducted, and the call roller 24 is reliably positioned to the raised position.

All of these are conducted by reversely rotating the sheet feeding-and-conveyance motor 51. However, moving the white-color guide 33 other than at the time of conducting the back surface shading correction is not favorable from the perspective of durability of components and operation sounds. Therefore, as described above, although the sheet feeding-and-conveyance motor 51 is reversely rotated and driven to the set reverse rotation angle, the rotation transmission from the sheet feeding-and-conveyance motor 51 to the cam drive shaft 42 is interrupted, and the guide function of the white-color guide 33 at the fixed position is stably secured.

(At the Time of Shading Correction)

In the shading correction (hereinafter, referred to as back surface shading correction) of the back surface reading system in the digital multifunction peripheral 1 of the present embodiment, adjustment to suppress the color unevenness and the like is executed based on the read value of the white reference face 33a by the back image reading module 35.

This back surface shading correction is first executed before reading the first document after startup of the digital multifunction peripheral 1. Further, when the predetermined time has passed during the continuous operation of the digital multifunction peripheral 1, the intermittent shading correction processing for performing the shading correction is conducted again.

At this adjustment for the shading correction, by reading the plurality of data while moving the white-color guide 33 in the main scanning direction, as described above, the stable back surface shading correction is executed without being affected by the dirt or the like adhering on the white reference face 33a.

In this case, in the first reverse rotation drive region of the sheet feeding-and-conveyance motor 51, the region corresponding to the elevation angle α of the call roller 24, the operation of the moving assembly 40 is regulated by the one-way assembly 45 and the movement regulator 46 in the second drive line DL2. Then, when the output shaft 51a reaches the second reverse rotation drive region where the output shaft 51a is rotated in the reverse rotation direction beyond the set reverse rotation angle, the moving assembly 40 relatively moves the back image reading module 35 and the white-color guide 33.

To be specific, when the leading end of the document reaches the predetermined leading end position after feed, the sheet feeding clutch 52 is switched to be the non-coupling state (OFF state) and the sheet feeding-and-conveyance motor 51 is stopped, so that the conveyance of the document is stopped once.

Next, the sheet feeding-and-conveyance motor 51 is reversely rotated until the output shaft 51a reaches the second reverse rotation drive region where the output shaft 51a is rotated in the reverse rotation direction beyond the set reverse rotation angle, under the OFF state of the sheet feeding clutch 52.

At this time, until the reverse rotation angle of the output shaft 51a reaches the set reverse rotation angle corresponding to the elevation angle α, the rotation transmission route from the sheet feeding-and-conveyance motor 51 to the cam drive shaft 42 is interrupted by the one-way assembly 45 and the movement regulator 46 in the second drive line DL2.

That is, the relative movement of the back image reading module 35 and the white-color guide 33 is delayed by the moving assembly 40 from when the rotation direction of the output shaft 51a is changed to the reverse rotation direction to when the rotation direction of the output shaft 51a reaches the second reverse rotation drive region, by the relative rotation of the pair of rotation transmitters 62 and 64.

Figure 9:
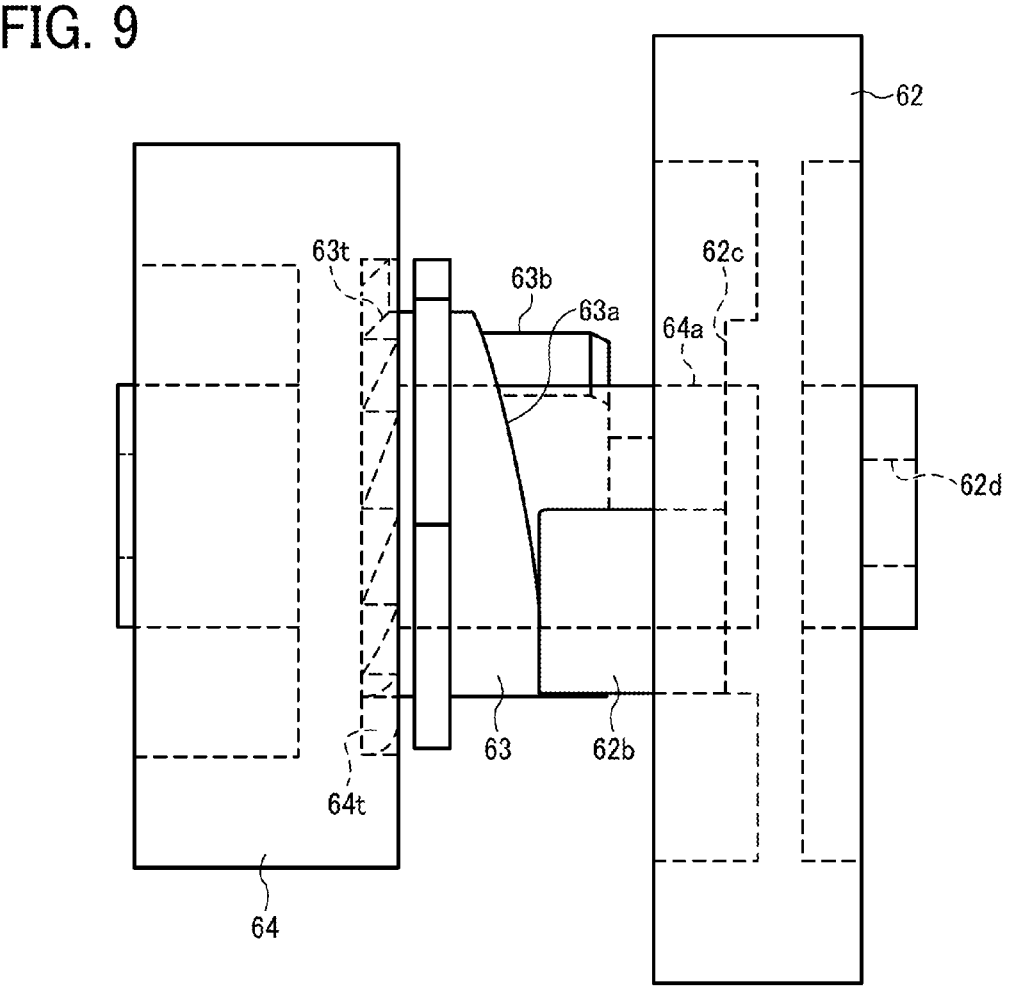
FIG. 9 is a side view of a clutch connection state illustrating an engagement state of the collar member and the pair of rotation transmitters of the unidirectional transmission assembly that has become a transmission state at the time when the drive of the color reference member by the moving assembly in the automatic document feeding device according to the first embodiment of the present disclosure is started.

Next, when the rotation angle of the reverse rotation direction of the sheet feeding-and-conveyance motor 51 reaches the set reverse rotation angle, the projecting piece 62b of the drive-side rotation transmitter 62 butts against the other end face side of the stopper 63b of the collar member 63. Then, in the second reverse rotation drive region where the output shaft 51a of the sheet feeding-and-conveyance motor 51 is rotated in the reverse rotation direction beyond the set reverse rotation angle, both of the one-way assembly 45 and the movement regulator 46 become a rotation transmittable state, as illustrated in FIG. 9.

To be more specific, at the time of the reverse rotation of the sheet feeding-and-conveyance motor 51, the drive input to the drive-side rotation transmitter 62 rotates the driven-side rotation transmitter 64 through the collar member 63. At this time, the projecting piece 62b of the drive-side rotation transmitter 62 and the end-face cam portion 63a of the collar member 63 come in contact, differently from the time of the forward rotation, so that the collar member 63 is moved toward the driven-side rotation transmitter 64, as illustrated in FIG. 8. Then, as illustrated in FIG. 9, when the ratchet gears 63t and 64t of the collar member 63 and the driven-side rotation transmitter 64 are engaged, rotation becomes transmittable from the drive-side rotation transmitter 62 to the driven-side rotation transmitter 64. At this time, the drive-side rotation transmitter 62, the collar member 63, and the driven-side rotation transmitter 64 are co-rotated in a state where the projecting piece 62b of the drive-side rotation transmitter 62 and the stopper 63b of the collar member 63 butt against the other side in the relative rotation direction.

Therefore, the rotation is transmitted from the sheet feeding-and-conveyance motor 51 to the cam drive shaft 42, and the cylindrical cam 41 of the moving assembly 40 is rotated, so that the white-color guide 33 is driven in the axial direction of the cylindrical cam 41 through the projection pin 33b engaged with the spiral cam groove 41a.

At this time, the white-color guide 33 is relatively moved with respect to the back image reading module 35 while being moved in the main scanning direction that is the axial direction of the cylindrical cam 41.

Then, the back surface shading correction is executed while the white-color guide 33 is moved in the main scanning direction.

When the back surface shading correction is completed, the sheet feeding-and-conveyance motor 51 is stopped, then the sheet feeding clutch 52 is returned to the ON state again, and the sheet feeding-and-conveyance motor 51 is forwardly rotated, so that the conveyance of the document is started.

After that, the sheet feeding-and-conveyance of the document, the image reading, and the ejection operation are continuously executed while desired document conveyance interval is maintained by ON/OFF switching of the sheet feeding clutch 52 at appropriate timing.

Note that, in the present embodiment, all of the rollers are moved by the single sheet feeding-and-conveyance motor 51 including the common output shaft 51a. Therefore, in a state where the document sheet is sandwiched by nips of the feed roller 25 and subsequent conveyance rollers, rotation of which can be stopped by the sheet feeding clutch 52, the back surface shading correction is not conducted. Further, at the time of the back surface intermittent shading, the sheet feeding clutch 52 is switched to the OFF state, so that the back surface shading operation can be conducted while the call roller 24 remains lowered, and sheet feeding of the next document can be instantly started upon completion of the shading correction.

Movement regulation by the movement regulator 46 at the time of the reverse rotation of the sheet feeding-and-conveyance motor 51, that is, the time to delay the operation to move the white-color guide 33 in the main scanning direction can be adjusted by setting. That is, setting an angle range (lift start angle position) where a lift amount becomes the minimum constant value in the end-face cam portion 63a, and a slope angle of the end-face cam portion 63a are appropriately set, so that the operation delay time can be adjusted.

(Functions)

As described above, in the present embodiment, rising of the call roller 24 by the elevation assembly 30 and the operation to move the white-color guide 33 in the main scanning direction at the time of the back surface shading correction are executed by the rotation output of the sheet feeding-and-conveyance motor 51 that is a single drive source in the reverse rotation direction. Therefore, with a single drive source, the operation to move the white-color guide 33 in the main scanning direction is performed in the operation to raise the call roller 24 at the time of the normal sheet feeding-and-conveyance, and this is not favorable from the perspective of durability of components and operation sounds.

In contrast, in the present embodiment, the movement regulator 46 is provided in the halfway of the second drive line DL2 that transmits the drive from the sheet feeding-and-conveyance motor 51 to the moving assembly 40. Further, the delay angle β of the rotation transmission start by the movement regulator 46 at the time of the reverse rotation of the sheet feeding-and-conveyance motor 51 is set to be larger than the elevation angle α of the pickup holder 26 in the elevation assembly 30.

Therefore, the white-color guide 33 does not cause unnecessary movement at the time of the operation to raise the call roller 24 after document ejection.

That is, in the ADF 20 of the present embodiment, the conveyance unit 27 and the moving assembly 40 can be driven by the common output shaft 51a of the sheet feeding-and-conveyance motor 51 that is a single drive source. Therefore, it is not necessary to separately provide a special drive source other than the sheet feeding-and-conveyance motor 51 for the relative movement of the white-color guide 33 and the back image reading module 35 at the time of the back surface shading correction.

Furthermore, in the first reverse rotation drive region of the output shaft 51a, the relative movement of the back image reading module 35 and the white-color guide 33 is regulated by the movement regulator 46. Then, in the second reverse rotation drive region of the output shaft 51a beyond the first reverse rotation drive region, the moving assembly 40 relatively moves the back image reading module 35 and the white-color guide 33. Therefore, the white-color guide 33 or the back image reading module 35 can be moved at timing when the shading correction is necessary.

Further, in the present embodiment, the movement regulator 46 includes the pair of rotation transmitters 62 and 64 relatively rotatable within the delay angle β in the rotation transmission route from the output shaft 51a to the moving assembly 40. Therefore, as a gap angle that causes a delay of drive in the rotation transmission route from the sheet feeding-and-conveyance motor 51 to the moving assembly 40, it is enough to set the delay angle β, and the movement regulator 46 can be made simple and compact.

Further, in the present embodiment, the movement regulator 46 includes the collar member 63 relatively rotatable with respect to the drive-side rotation transmitter 62 within the delay angle β, and the collar member 63 engages the driven-side rotation transmitter 64 to allow rotation transmission only in the reverse rotation direction. Therefore, a simple and compact movement regulator 46, which delays the rotation transmission between the pair of rotation transmitters 62 and 64 by the collar member 63 at appropriate timing, can be realized.

In addition, in the present embodiment, the collar member 63 includes the stopper 63b, the ratchet gear 63t, and the ringed protection wall 63e that surrounds the stopper 63b and the ratchet gear 63t. Accordingly, the stopper 63b and the ratchet gear 63t that are engagement portions for the rotation transmission can be appropriately protected, and intrusion of the foreign substance or the like into the vicinity of the collar member 63 can be prevented.

Further, in the present embodiment, in the rotation transmission route to the drive-side rotation transmitter 62 in the second drive line DL2, the deceleration gear assembly 68 that decelerates the rotation from the output shaft 51a side is included. Therefore, the output rotation angle of the sheet feeding-and-conveyance motor 51, the angle corresponding to the delay angle β, can be made large, and the gap angle in the circumferential direction between the pair of rotation transmitters 62 and 64, the angle corresponding to the delay angle β, can be made small. As a result, even if the movement regulator 46 is downsized, excessive accuracy of the components and the rotation angle is not required.

Further, in the ADF 20 of the present embodiment, after the call roller 24 is raised to the stand-by position by the rotation in the opposite direction to the sheet feeding-and-conveyance motor 51, the white-color guide 33 and the back image reading module 35 can be reliably relatively moved, when the shading correction is necessary.

In the digital multifunction peripheral 1 of the present embodiment, the controllers 100 and 111 that are controllers rotate the output shaft 51a in the reverse rotation direction beyond the set reverse rotation angle when the number of times of image formation in the image forming unit 15 reaches a period corresponding to the number of times of shading correction request set in advance (for example, at an initial point of time of a job and every predetermined time from the point of time). Then, accordingly, the back image reading module 35 and the white-color guide 33 are relatively moved, and the shading correction is executed using the white-color guide 33 having the white reference face 33a for shading correction. Therefore, by use of the small and simple ADF 20 that can move the white-color guide 33 or the back image reading module 35 only at appropriate timing when the shading correction is necessary, the digital multifunction peripheral 1 that can read the image of the document or can form an image with high image quality can be achieved.

As described above in the present embodiment, as the drive source that relatively moves the white-color guide 33 and the back image reading module 35 at the time of shading correction, the sheet feeding-and-conveyance motor 51 for other use can be used. In addition, the ADF 20 and the digital multifunction peripheral 1 that can reliably prevent the relative movement of the white-color guide 33 and the back image reading module 35 at unnecessary timing can be provided.

Second Embodiment

FIGS. 11 to 15 illustrate a second embodiment of the present disclosure.

Note that the present embodiment has approximately the same general arrangement as the first embodiment. Therefore, for the same or similar configurations to the first embodiment, reference codes of the corresponding configuration elements in FIGS. 1 to 10 are used, and different points from the first embodiment will be hereinafter described.

As illustrated in FIGS. 11 to 15, in the present embodiment, a first drive line DL1 from a sheet feeding-and-conveyance motor 51 of an ADF 20 to a feed roller shaft 25a, and a second drive line DL2 from the sheet feeding-and-conveyance motor 51 to a moving assembly 40 are different from those of the first embodiment.

In the ADF 20 of the present embodiment, a movement regulator 76 includes a pair of rotation transmitters 72 and 74 having a gear configuration, and a spring clutch 75 lying between the pair of rotation transmitters 72 and 74, in a rotation transmission route from an output shaft 51a to the moving assembly 40.

Figure 15:
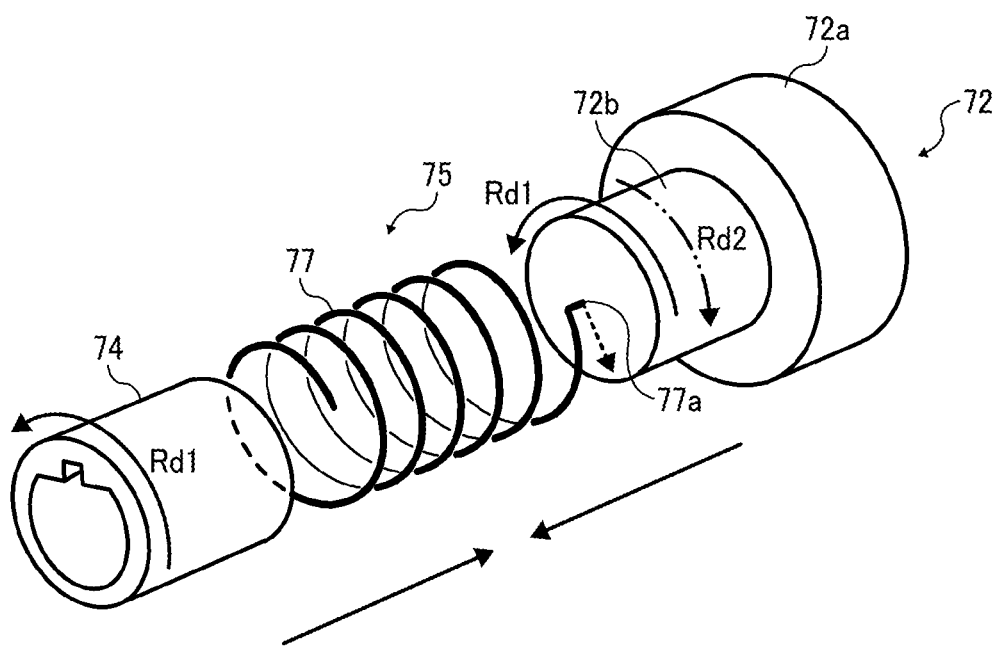
FIG. 15 is an exploded perspective view of the spring clutch assembly provided inside the movement regulator illustrated in FIG. 14.

As illustrated in FIG. 15, a drive-side rotation transmitter 72 includes a gear 72a that is engaged with a rotation transmitter 71 at an upstream side, and a boss 72b protruding from the gear 72a in the axial direction, and rotatably supported by a cam drive shaft 42 or a support shaft.

A driven-side rotation transmitter 74 is a cylindrical member integrally joined with the cam drive shaft 42 to be rotation-stopped.

The spring clutch 75 is configured from a so-called wrap spring clutch that is switched between a fastened state of being strongly wound around the pair of rotation transmitters 72 and 74, and a loosened state of being loosely wound around the pair of rotation transmitters 72 and 74, according to a twist direction by relative rotation of the pair of rotation transmitters 72 and 74.

This spring clutch 75 includes a wrap spring 77 fit into the pair of rotation transmitters 72 and 74 with a predetermined interference, and a ratchet gear-like cylindrical member 78 with which one end 77a of the wrap spring 77 is caught together.

While the wrap spring 77 regulates the relative rotation between the pair of rotation transmitters 72 and 74 in a first twist direction, in the fastened state, the wrap spring 77 allows relative rotation in a second twist direction that is an opposite direction to the first twist direction, in the loosened state.

The one end 77a of the wrap spring 77 is an end at one end side of the wrap spring 77 fit into the boss 72b of the drive-side rotation transmitter 72, and is caught together with a locking groove 78a at one end side of the cylindrical member 78. Further, the cylindrical member 78 is rotatably supported on an outer circumferential surface of the driven-side rotation transmitter 74 at an inner circumferential side.

The movement regulator 76 includes a plurality of ratchet gears 78r integrally provided at an outer peripheral side of the cylindrical member 78, and a switching operation member 81 that performs a switching operation of interruption/connection (an interruption state and a connection state) of the spring clutch 75 in cooperation with the plurality of ratchet gears 78r. Further, the movement regulator 76 includes a lower stopper 82 that defines a revolving angle range of the switching operation member 81 of when being detached from the plurality of ratchet gears 78r, and the lower stopper 82 is integrally provided with a body frame of the ADF 20, for example.

The switching operation member 81 includes a base end 81a coupled with a rotation transmitter 56 at the first drive line DL1 side through a known bidirectional torque limiter 83, and a locking claw 81b to be engaged with and detached from the ratchet gear 78r of the cylindrical member 78 according to revolving of the base end 81a.

This switching operation member 81 can rotation-stop the drive-side one end 77a of the wrap spring 77 through the cylindrical member 78 when engaging the locking claw 81b that is a rotation stopper with any of the plurality of ratchet gears 78r of the cylindrical member 78.

The wrap spring 77 is not fastened at the one end 77a side, and is loosened from an intermediate portion side, even if the drive-side rotation transmitter 72 is rotated in the fastening direction by the reverse rotation of the sheet feeding-and-conveyance motor 51, when the drive-side one end 77a is rotation stopped.

Figure 11:
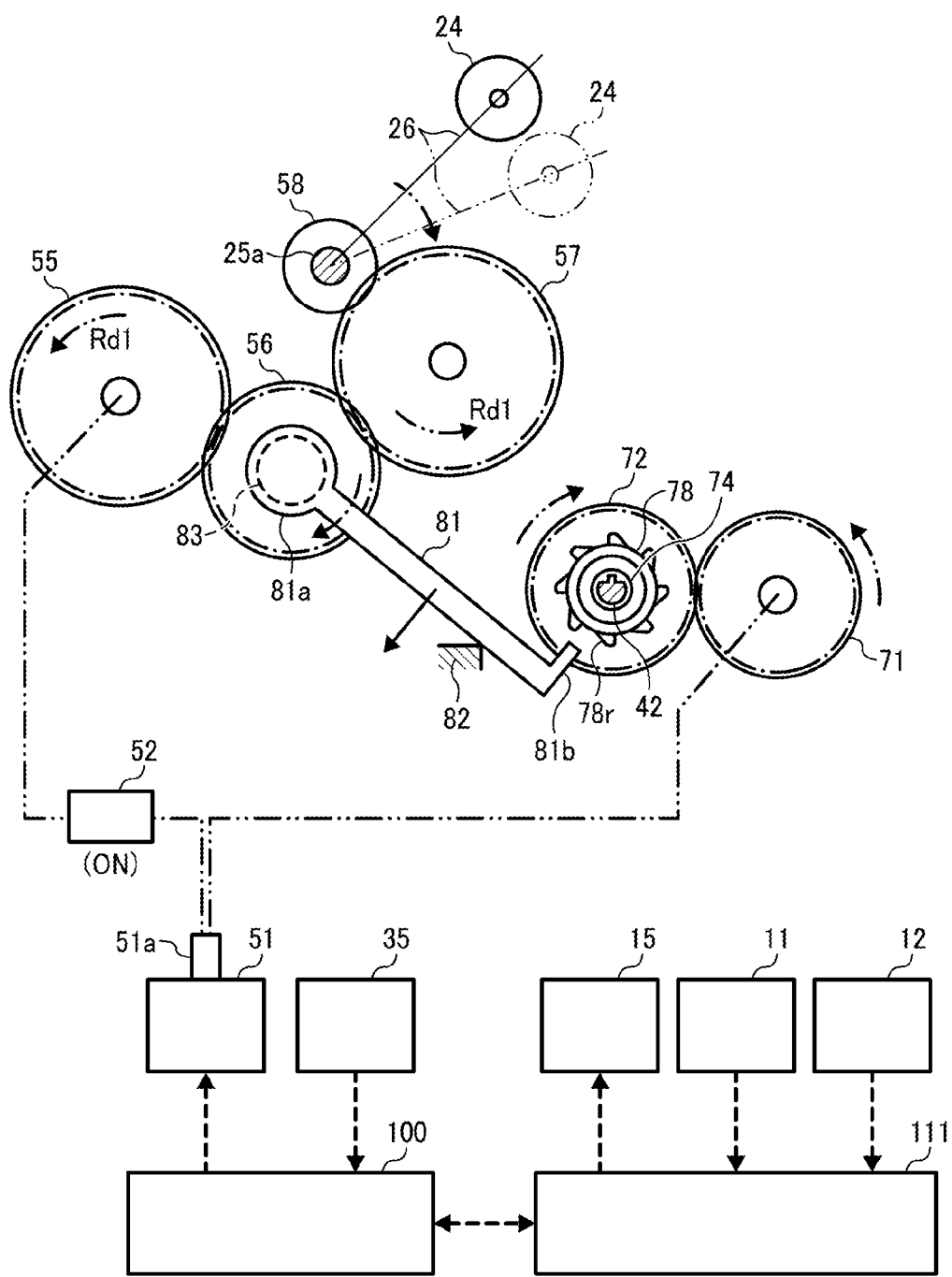
FIG. 11 is an illustration of a drive system illustrating a first drive line that transmits rotation from a sheet feeding-and-conveyance motor in the automatic document feeding device according to the second embodiment of the present disclosure to an elevation assembly of a call roller, a second drive line that transmits rotation from the sheet feeding-and-conveyance motor to a moving assembly of the color reference member, and a movement regulator fixed to both of the drive lines.

Note that, in FIG. 11, in a case where the sheet feeding-and-conveyance motor 51 performs forward rotation in the direction of the arrow Rd1, and a sheet feeding clutch 52 is in an ON state, the rotation transmitter 56 having a gear configuration rotates the switching operation member 81 in a clockwise direction in FIG. 11 to come in contact with the lower stopper 82. Butting force of the switching operation member 81 in the revolving direction is regulated within a predetermined range by the bidirectional torque limiter 83 at the time of contact with the stopper and at the time of engagement with the cylindrical member 78.

(Sheet Feeding-and-Conveyance Operation in DF Scanner Mode)

In the present embodiment, at the time of the forward rotation of the sheet feeding-and-conveyance motor 51 for a sheet feeding-and-conveyance operation, the rotation transmitters 55 to 58 in the first drive line DL1 are rotated in the direction illustrated by the broken-line arrow Rd1 in FIG. 11. At this time, the switching operation member 81 is revolved downward in FIG. 12 to detach the locking claw 81b from the ratchet gear 78r of the cylindrical member 78 of the spring clutch 75.

Further, in the second drive line DL2, the drive-side rotation transmitter 72 is driven to perform forward rotation by the forward rotation of the sheet feeding-and-conveyance motor 51, so that the drive-side rotation transmitter 72 is relatively rotated in the second twist direction with respect to the driven-side rotation transmitter 74, and the spring clutch 75 is in the loosened state. Therefore, the rotation from the output shaft 51a of the sheet feeding-and-conveyance motor 51 is interrupted by the spring clutch 75 between the pair of rotation transmitters 72 and 74.

(Rising of Call Roller)

Next, when a trailing end of a document passes through an ejection port 36, immediately after that (immediately after document ejection), the rotation direction of the output shaft 51a of the sheet feeding-and-conveyance motor 51 is switched from the forward rotation direction to the reverse rotation direction by a controller 100. Then, rotation in the reverse rotation direction is output from the output shaft 51a of the sheet feeding-and-conveyance motor 51 from the point of time of switching to a set reverse rotation angle set in advance.

At this time, the rotation from the output shaft 51a side is transmitted to a feed roller shaft 25a while being decelerated through the plurality of rotation transmitters 55 to 58 in the first drive line DL1. Therefore, a pickup holder 26 revolves upward by an elevation angle α that is a deceleration rotation angle corresponding to the set reverse rotation angle, and a call roller 24 is moved to a stand-by position where the next document can be set in accordance with the revolving of the pickup holder 26.

Meanwhile, from the point of time of switching the rotation direction of the output shaft 51a to when the sheet feeding-and-conveyance motor 51 is driven to perform the reverse rotation up to the set reverse rotation angle, the rotation transmission form the sheet feeding-and-conveyance motor 51 to the cam drive shaft 42 is temporarily interrupted by the movement regulator 76 in the second drive line DL2.

Figure 13:
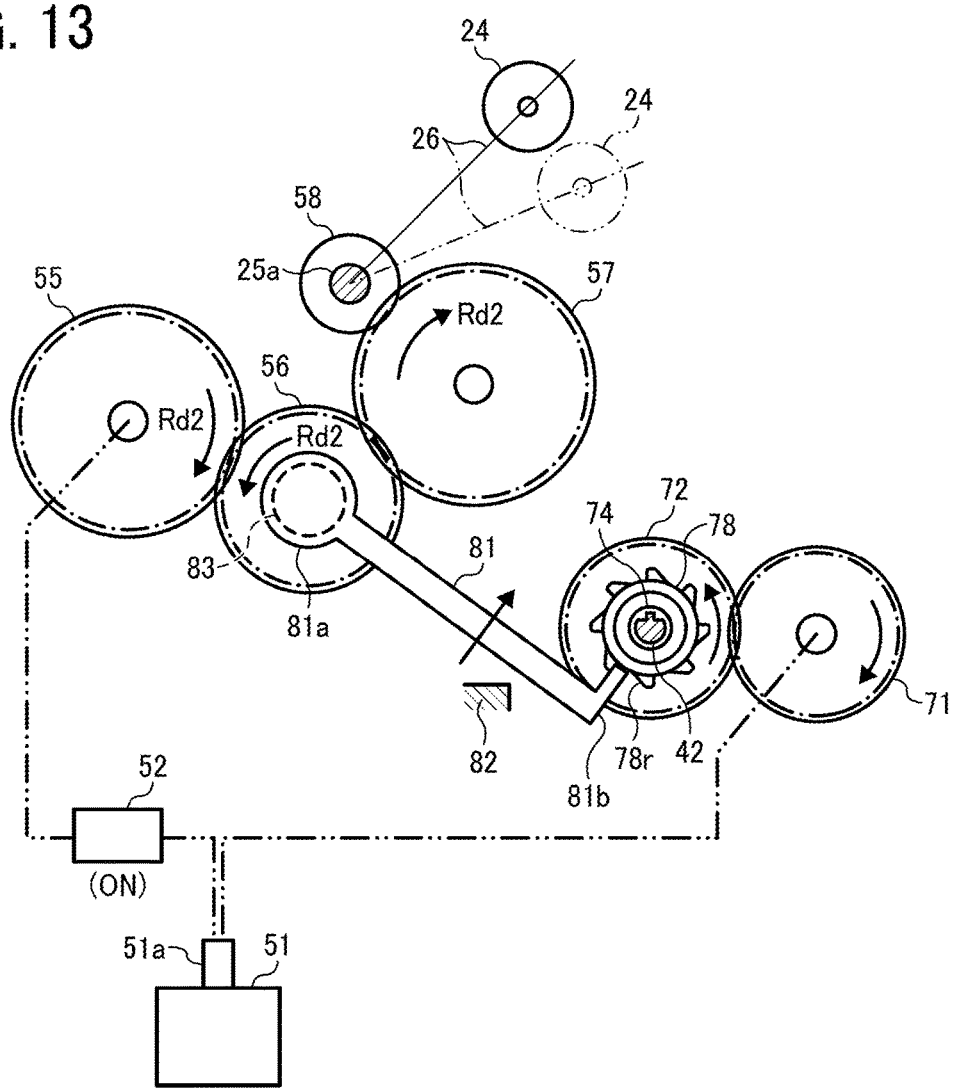
FIG. 13 is a state illustration of the first and second drive lines and the movement regulator at the time of call roller rising operation in the automatic document feeding device according to the second embodiment of the present disclosure.
Figure 14:
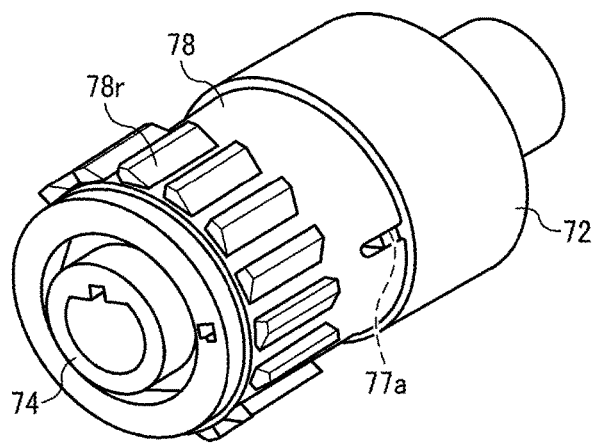
FIG. 14 is a perspective view illustrating a spring clutch assembly of the movement regulator in the automatic document feeding device according to the second embodiment of the present disclosure.

To be specific, when the sheet feeding-and-conveyance motor 51 is driven to perform the reverse rotation up to the set reverse rotation angle, in the ON state of the sheet feeding clutch 52, the switching operation member 81 directly connected to the rotation transmitter 56 is revolved upward in FIG. 13 to engage the locking claw 81*b* with the ratchet gear 78*r* of the cylindrical member 78.

At this time, the cylindrical member 78 is rotation-stopped, and the drive-side one end 77*a* of the wrap spring 77 is rotation-stopped.

Therefore, even if the drive-side rotation transmitter 72 is rotated in the fastening direction by the reverse rotation of the sheet feeding-and-conveyance motor 51, the wrap spring 77 of the spring clutch 75 is not fastened from the one end 77*a* side, and becomes a loosened state by friction from the intermediate portion side.

As a result, the rotation from the sheet feeding-and-conveyance motor 51 to the cam drive shaft 42 is interrupted between the pair of rotation transmitters 72 and 74 by the spring clutch 75, and the moving assembly 40 does not relatively move a back image reading module 35 and a white-color guide 33. Therefore, a guide function of the white-color guide 33 at a fixed position is stably secured.

(At the Time of Shading Correction)

At back surface shading correction, similarly to the first embodiment, by moving the white-color guide 33 in a main scanning direction and reading a white reference face 33*a*, the stable back surface shading correction is executed without being affected by the dirt or the like adhering on the white reference face 33*a*.

Figure 12:
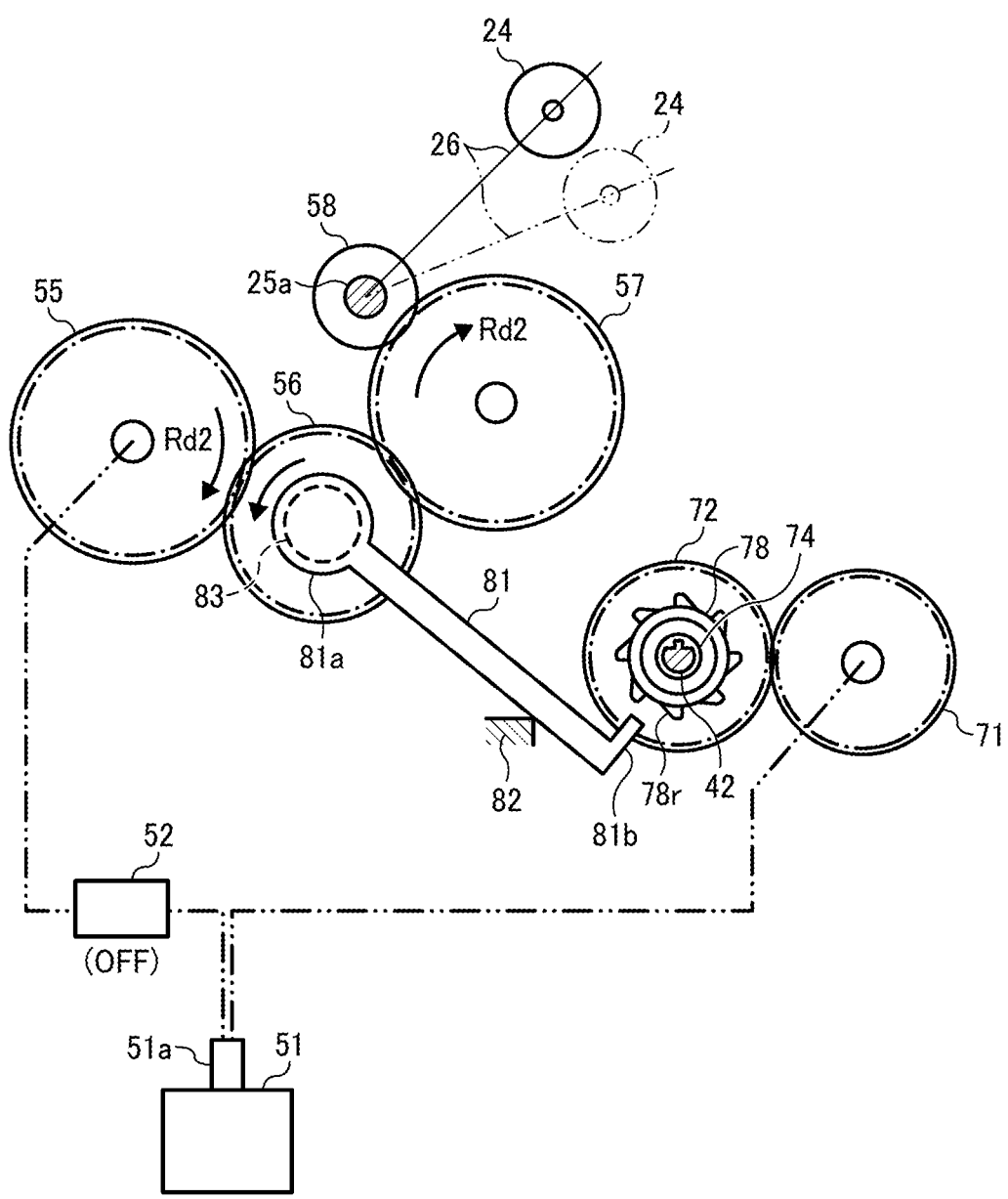
FIG. 12 is a state illustration of first and second drive lines and a movement regulator at the time of shading correction of a back image reading unit in an automatic document feeding device according to a second embodiment of the present disclosure.

At this time, as illustrated in FIG. 12, the sheet feeding clutch 52 becomes an OFF state in a first reverse rotation drive region of the sheet feeding-and-conveyance motor 51, and the rotation is transmitted from the sheet feeding-and-conveyance motor 51 to the moving assembly 40 through the spring clutch 75 in a fastened state in the second drive line DL2.

To be specific, when a leading end of a document reaches a predetermined leading end position after feed, the sheet feeding clutch 52 is switched to a non-coupling state (OFF state), the sheet feeding-and-conveyance motor 51 is stopped, and conveyance of the document is stopped once.

Next, the sheet feeding-and-conveyance motor 51 is reversely rotated until the output shaft 51*a* reaches the set reverse rotation angle under the OFF state of the sheet feeding clutch 52.

At this time, since the switching operation member 81 is lowered to the position where the switching operation member 81 comes in contact with the lower stopper 82, when the drive-side rotation transmitter 72 is rotated in the reverse rotation direction, the rotation is transmitted to the driven-side rotation transmitter 74 through the spring clutch 75 in the fastened state.

Therefore, the rotation is transmitted from the sheet feeding-and-conveyance motor 51 to the cam drive shaft 42, and a cylindrical cam 41 of the moving assembly 40 is rotated, so that the white-color guide 33 is driven in an axial direction of the cylindrical cam 41 through a projection pin 33*b* engaged with a spiral cam groove 41*a*.

At this time, the white-color guide 33 is relatively moved with respect to the back image reading module 35 while being moved in a main scanning direction that is the axial direction of the cylindrical cam 41. Then, the back surface shading correction is executed while the white-color guide 33 is moved in the main scanning direction.

In the present embodiment, as described above, a unidirectional rotation assembly is provided, which is made of the spring clutch 75 that interrupts the rotation transmission in the forward rotation direction between the pair of rotation transmitters 72 and 74 at the time of the forward rotation of the sheet feeding-and-conveyance motor 51. Then, switching of interruption/connection of the rotation transmission between the pair of rotation transmitters 72 and 74 can be easily achieved by the simple switching operation member 81, using the function of the spring clutch 75.

Further, in the present embodiment, the switching operation member 81 is coupled, through the bidirectional torque limiter 83, with the rotation transmitter 56 provided in the first drive line DL1 that is the rotation transmission route from the output shaft 51*a* to the elevation assembly 30. Therefore, the switching operation member 81 comes in contact with the ratchet gear 78*r* of the cylindrical member 78 to be in contact at the time of rising, and the lower stopper 82 of the cover 38 side to be in contact at the time of machining, with adequate force. Therefore, an adequate revolving angle and stable operation force of the switching operation member 81 can be obtained. Furthermore, when the output shaft 51*a* is rotated in the reverse rotation direction, the switching operation member 81 is engaged with the driven-side (downstream-side) rotation transmitter 74 positioned at the moving assembly 40 side, of the pair of rotation transmitters 72 and 74 to allow rotation regulation.

Therefore, when the rotation of the driven-side rotation transmitter 74 is regulated by the locking claw 81*b* of the switching operation member 81, the rotation transmission between the pair of rotation transmitters 72 and 74 is reliably interrupted by the spring clutch 75. As a result, the white-color guide 33 or the back image reading module 35 is not moved when the shading correction is unnecessary.

In addition, in the present embodiment, the first drive line DL1 is interrupted/connected according to the operation of the conveyance unit 27 and the moving assembly 40, by the sheet feeding clutch 52 in the first drive line DL1. Further, engagement and detachment of the locking claw 81*b* of the switching operation member 81 with/from the driven-side rotation transmitter 74 is switched by the sheet feeding clutch 52. Then, the sheet feeding clutch 52 is in the connection state to engage the locking claw 81*b* of the switching operation member 81 with the driven-side rotation transmitter 74 until the output shaft 51*a* reaches the set reverse rotation angle after the sheet feeding-and-conveyance motor 51 changes the rotation direction of the output shaft 51*a* to the reverse rotation direction.

In doing so, the period in which the rotation of the driven-side rotation transmitter 74 is regulated by the locking claw 81*b* of the switching operation member 81 can be set to a period during the reverse rotation of the sheet feeding-and-conveyance motor 51 as illustrated in FIG. 13, and in which the sheet feeding clutch 52 becomes the connection state. Furthermore, at the time of the forward rotation of the sheet feeding-and-conveyance motor 51, switching of the drive state according to the interruption/connection state of the sheet feeding clutch 52 becomes possible, and a large number of members to be driven can be driven by the common sheet feeding-and-conveyance motor 51.

In the present embodiment, as the drive source that relatively moves the white-color guide 33 and the back image reading module 35 at the time of shading correction, the sheet feeding-and-conveyance motor 51 for other use can be used, and the relative movement can be reliably prevented from being caused at unnecessary timing.

Note that, in the present embodiment, when the output shaft 51a is rotated in the reverse rotation direction beyond the set reverse rotation angle, the sheet feeding clutch 52 can be made to be in the interruption state.

In the above embodiments, the moving assembly 40 moves the white-color guide 33 and the back image reading module 35 in the main scanning direction at the time of the shading correction. However, the direction may be different moving directions.

Further, in the above embodiments, the description has been made such that the switching the drive rotation direction of the sheet feeding-and-conveyance motor 51 from the forward rotation direction to the reverse rotation direction, and reversely rotating the output shaft 51a to the set reverse rotation angle is at the time of raising the call roller 24 to the stand-by position and at the time of the shading correction. However, when the sheet feeding-and-conveyance motor 51 is reversely rotated to the set reverse rotation angle other than at the time of the shading correction, an operation other than raising the call roller 24 may be performed.

Further, the operation to raise the call roller 24 itself is executed at each timing of ON of the power supply of the digital multifunction peripheral 1, restoration from power saving, opening/closing of the platen, paper jam processing, or maintenance, and is not limited to the immediately after document ejection, as described above.

It is indisputable that a conventional arbitrary rotary-linear motion converting mechanism can be employed in place of the cylindrical cam 41 and the cam drive shaft 42 of the moving assembly 40. It is apparent that the present disclosure can be applied to a case of using the DF scanner for reading not only the back image but also the surface image.

In one aspect of the present disclosure, an automatic document feeding device includes a conveyance unit to convey a document to an image reading position, an image reading unit to read an image of the document, a color reference member facing the image reading unit and including a white reference face to correct shading, a moving assembly to relatively move the image reading unit and the color reference member, a movement regulator to regulate a relative movement of the image reading unit and the color reference member by the moving assembly, and a drive source including a common rotation output shaft to drive the conveyance unit and the moving assembly. The drive source changes the rotation output shaft from a forward rotation direction to a reverse rotation direction to reversely rotate the rotation output shaft to a set reverse rotation angle set in advance, according to a condition of conveyance of the document by the conveyance unit. In a rotation transmission route from the rotation output shaft to the moving assembly, the movement regulator is disposed in a first reverse rotation drive region from when a rotation direction of the rotation output shaft is changed to the reverse rotation direction to when a rotation angle of the rotation output shaft after the change in the reverse rotation direction reaches the set revere rotation angle. The moving assembly relatively moves the image reading unit and the color reference member in a second reverse rotation drive region where the rotation output shaft is rotated in the reverse rotation direction beyond the set reverse rotation angle.

With this configuration, in the automatic document feeding device of the present disclosure, the conveyance unit and the moving assembly can be driven by the common rotation output shaft of the drive source, and it is not necessary to separately provide a special drive source for relative movement of the color reference member and the image reading unit at the time of shading correction. Furthermore, in the first reverse rotation drive region of the rotation output shaft, the relative movement of the image reading unit and the color reference member is regulated by the movement regulator, and the moving assembly relatively moves the image reading unit and the color reference member in the second reverse rotation drive region of the rotation output shaft beyond the first reverse rotation drive region. Therefore, the color reference member and the image reading unit can be moved only at timing when the shading correction is necessary.

In the automatic document feeding device according to another aspect of the present disclosure, the movement regulator favorably includes a pair of rotation transmitters relatively rotatable within a delay angle set in advance in the rotation transmission route from the rotation output shaft to the moving assembly, and the moving assembly favorably delays an operation to relatively move the image reading unit and the color reference member to positions where the image reading unit and the color reference member are used to correct shading, by relative rotation of the pair of rotation transmitters, from when the rotation direction of the rotation output shaft is changed to the reverse rotation direction to when the rotation output shaft reaches the second reverse rotation drive region.

In this case, it is sufficient to provide a gap angle that causes a delay of drive in the rotation transmission route from the drive source to the moving assembly. Therefore, the movement regulator can be made simple and compact.

The movement regulator favorably includes a collar member relatively rotatable within the delay angle with respect to one rotation transmitter of the pair of rotation transmitters disposed at a side of the rotation output shaft. The collar member is engaged with the other rotation transmitter of the pair of rotation transmitters disposed at a side of the moving assembly to allow rotation transmission only in the reverse rotation direction.

In this case, a simple and compact movement regulator that delays the rotation transmission between the pair of rotation transmitters by the collar member at appropriate timing can be realized.

The collar member may include a first engagement portion engageable with and detachable from the one rotation transmitter in a direction of rotation, a second engagement portion to engage the other rotation transmitter to allow rotation transmission only in the reverse rotation direction, and a ringed protection wall that surrounds the first engagement portion and the second engagement portion.

Such a configuration allows reliable protection of the engagement portion for the rotation transmission and prevents intrusion of a foreign substance or the like.

The movement regulator may include a deceleration gear assembly in a rotation transmission route from the rotation output shaft to the one rotation transmitter, to decelerate rotation from the rotation output shaft. With such a configuration, an output rotation angle of the drive source corresponding to the delay angle can be made large, and the gap angle in a circumferential direction can be made small. Therefore, even if the movement regulator is downsized, excessive accuracy of components and the rotation angle is not required.

In another aspect of the present disclosure, the automatic document feeding device further includes a document mount table disposed upstream from the conveyance unit in a direction of conveyance of the document, a call roller to call the document on the document mount table to the conveyance unit, and an elevation assembly to lower the call roller to approach a document mount surface of the document mount table according to a forward rotation of the rotation output shaft in the forward rotation direction, and raises the call roller to be separated from the document mount surface of the document mount table according to a reverse rotation of the rotation output shaft in the reverse rotation direction, and the elevation assembly can raise the call roller to a stand-by position above the document mount table from when the drive source changes the rotation direction of the rotation output shaft to the reverse rotation direction to when the rotation angle of the rotation output shaft in the reverse rotation direction reaches the set reverse rotation angle.

In this case, by raising the call roller to the stand-by position, conveyance of the next document or document setting can be easily performed. Furthermore, when the shading correction is necessary, the color reference member and the image reading unit can be reliably relatively moved after rising of the call roller.

In the automatic document feeding device according to another aspect of the present disclosure, the movement regulator includes a pair of rotation transmitters in the rotation transmission route from the rotation output shaft to the moving assembly, and a switching operation member that can switch the pair of rotation transmitters to a rotation transmittable contact state and an interruption state of interrupting the rotation transmission. A spring clutch may be interposed between the pair of rotation transmitters. According to a twist direction due to the relative rotation of the pair of rotation transmitters, the spring clutch is switchable to a fastened state where the spring clutch regulates the relative rotation to a first twist direction and a loosened state where the spring clutch allows the relative rotation to a second twist direction opposite to the first twist direction. The switching operation member may include a base end coupled via a bidirectional torque limiter to any one of the plurality of rotation transmitters disposed in the rotation transmission route from the rotation output shaft to the elevation assembly, and a rotation stopper to engage a driven-side rotation transmitter of the pair of rotation transmitters disposed at the side of the moving assembly to allow rotation regulation when the rotation output shaft is rotated in the reverse rotation direction. When rotation of the driven-side rotation transmitter is regulated by the rotation stopper of the switching operation member, the spring clutch can be switched to the loosened state where the relative rotation of the pair of rotation transmitters in the second twist direction is allowed.

In doing so, a unidirectional rotation assembly or the like that interrupts the rotation transmission between the pair of rotation transmitters at the time of forward rotation of the drive source such as at the time of the sheet conveyance is provided, and switching of interruption/connection of the rotation transmission between the pair of rotation transmitters can be easily achieved by the switching operation member using a part of functions of the unidirectional rotation assembly. Further, at the time of reverse rotation of the drive source, the rotation of the driven-side rotation transmitter is regulated by the rotation stopper of the switching operation member, and the rotation transmission between the pair of rotation transmitters can be reliably interrupted by the spring clutch. Therefore, movement of one of the color reference member and the image reading unit when the shading correction is unnecessary can be reliably prevented.

In the automatic document feeding device according to another aspect of the present disclosure, a sheet feeding clutch may be disposed in the rotation transmission route from the rotation output shaft to the elevation assembly. The sheet feeding clutch connects and interrupts the rotation transmission route according to operations of the conveyance unit and the moving assembly, and the switching operation member can switch engagement and detachment of the rotation stopper with respect to the driven-side rotation transmitter, when the sheet feeding clutch is in a connection state of connecting the rotation transmission route.

In doing so, the period in which the rotation of the driven-side rotation transmitter is regulated by the rotation stopper of the switching operation member can be set to the period during the reverse rotation of the drive source, and when the sheet feeding clutch becomes the connection state. Furthermore, switching of the drive state according to an interruption/connection state of the sheet feeding clutch becomes possible at the time of the forward rotation of the drive source, and a large number of members to be driven can be driven by the common drive source.

In one aspect of the present disclosure, an image forming apparatus includes the automatic document feeding device according to any of the above-described aspects; an image forming unit that forms an external output image based on a read image in the image reading unit of the automatic document feeding device; and a controller that rotates the rotation output shaft in the reverse rotation direction beyond the set reverse rotation angle to relatively move the image reading unit and the color reference member, when the number of times of image formation in the image forming unit reaches a period corresponding to the number of times of shading correction requests set in advance, and executes the shading correction of the image formed in the image forming unit using the color reference member including the white reference face for the shading correction.

With the configuration, in the image forming apparatus, by use of the small and simple automatic document feeding device that can move the color reference member or the image reading unit only at appropriate timing when the shading correction is necessary, document image reading and image formation with high image quality become possible.

As described above, according to at least one aspect of the present disclosure, an automatic document feeding device and an image forming apparatus that can reliably prevent relative movement of the color reference member and the image reading unit from being caused at unnecessary timing, while causing a drive source to have other use, which relatively moves the color reference member and the image reading unit at the time of shading correction, can be provided.

As described above, according to at least one aspect of the present disclosure, an effect is obtained of reliably preventing the relative movement from being caused at unnecessary timing while using the drive source of other use, for the drive source that relatively moves the color reference member and the image reading unit at the time of shading correction. Such teachings are generally useful for an automatic document feeding device that secures an image reading position and conveys a document to the image reading position, and an image forming apparatus including the automatic document feeding device.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An automatic document feeding device comprising:
    a conveyance unit to convey a document to an image reading position;
    an image reading unit to read an image of the document;
    a color reference member facing the image reading unit and including a white reference face to correct shading;
    a moving assembly to relatively move the image reading unit and the color reference member;
    a movement regulator to regulate a relative movement of the image reading unit and the color reference member by the moving assembly; and
    a drive source, including a common rotation output shaft to drive the conveyance unit and the moving assembly, to change the common rotation output shaft from a forward rotation direction to a reverse rotation direction to reversely rotate the common rotation output shaft to a set reverse rotation angle set in advance, according to a condition of conveyance of the document by the conveyance unit,
    wherein, in a rotation transmission route from the common rotation output shaft to the moving assembly, the movement regulator is disposed in a first reverse rotation drive region from when a rotation direction of the common rotation output shaft is changed to the reverse rotation direction to when a rotation angle of the common rotation output shaft after the change in the reverse rotation direction reaches the set reverse rotation angle, and
    wherein the moving assembly relatively moves the image reading unit and the color reference member in a second reverse rotation drive region where the common rotation output shaft is rotated in the reverse rotation direction beyond the set reverse rotation angle.

2. The automatic document feeding device according to claim 1,
    wherein the movement regulator includes a pair of rotation transmitters relatively rotatable within a delay angle set in advance in the rotation transmission route from the common rotation output shaft to the moving assembly, and
    wherein the moving assembly delays an operation to relatively move the image reading unit and the color reference member to positions where the image reading unit and the color reference member are used to correct shading, by relative rotation of the pair of rotation transmitters, from when the rotation direction of the common rotation output shaft is changed to the reverse rotation direction to when the common rotation output shaft reaches the second reverse rotation drive region.

3. The automatic document feeding device according to claim 2,
    wherein the movement regulator includes a collar member relatively rotatable within the delay angle with respect to one rotation transmitter of the pair of rotation transmitters disposed at a side of the common rotation output shaft,
    wherein the collar member engages the other rotation transmitter of the pair of rotation transmitters disposed at a side of the moving assembly, to allow rotation transmission only in the reverse rotation direction.

4. The automatic document feeding device according to claim 3,
    wherein the collar member includes a first engagement portion engageable with and detachable from the one rotation transmitter in a direction of rotation, a second engagement portion to engage the other rotation transmitter to allow rotation transmission only in the reverse rotation direction, and a ringed protection wall that surrounds the first engagement portion and the second engagement portion.

5. The automatic document feeding device according to claim 2,
    wherein the movement regulator includes a deceleration gear assembly in a rotation transmission route from the common rotation output shaft to one rotation transmitter of the pair of rotation transmitters, to decelerate rotation from the common rotation output shaft.

6. The automatic document feeding device according to claim 1, further comprising:
    a document mount table disposed upstream from the conveyance unit in a direction of conveyance of the document;
    a call roller to call the document on the document mount table to the conveyance unit; and
    an elevation assembly to lower the call roller to approach a document mount surface of the document mount table according to a forward rotation of the common rotation output shaft in the forward rotation direction, and to raise the call roller to be separated from the document mount surface of the document mount table according to a reverse rotation of the common rotation output shaft in the reverse rotation direction,
    wherein the elevation assembly raises the call roller to a stand-by position above the document mount table from when the drive source changes the rotation direction of the common rotation output shaft to the reverse rotation direction to when the rotation angle of the common rotation output shaft in the reverse rotation direction reaches the set reverse rotation angle.

7. The automatic document feeding device according to claim 1,
    wherein the movement regulator includes a pair of rotation transmitters in the rotation transmission route from the common rotation output shaft to the moving assembly, and a switching operation member to be able to switch the pair of rotation transmitters to a rotation transmittable connection state and an interruption state of interrupting the rotation transmission,
    wherein a spring clutch is interposed between the pair of rotation transmitters,
    wherein, according to a twist direction due to relative rotation of the pair of rotation transmitters, the spring clutch is switchable to a fastened state where the spring clutch regulates the relative rotation in a first twist direction and a loosened state where the spring clutch allows the relative rotation in a second twist direction opposite to the first twist direction,
    wherein the switching operation member includes a base end coupled via a bidirectional torque limiter to any one of a plurality of rotation transmitters disposed in the rotation transmission route from the common rotation output shaft to an elevation assembly, and a rotation stopper to engage a driven-side rotation transmitter of the pair of rotation transmitters disposed at a side of the moving assembly to allow rotation regulation when the common rotation output shaft is rotated in the reverse rotation direction, and wherein, when rotation of the driven-side rotation transmitter is regulated by the rotation stopper of the switching operation member, the spring clutch is switched to the loosened state where the relative rotation of the pair of rotation transmitters in the second twist direction is allowed.

8. The automatic document feeding device according to claim 7, further comprising a sheet feeding clutch disposed in the rotation transmission route from the common rotation output shaft to the elevation assembly, the sheet feeding clutch configured to connect and interrupt the rotation transmission route according to operations of the conveyance unit and the moving assembly, wherein the switching operation member switches engagement and detachment of the rotation stopper with respect to the driven-side rotation transmitter when the sheet feeding clutch is in a connection state of connecting the rotation transmission route.

9. An image forming apparatus comprising:

the automatic document feeding device according to claim 1;

an image forming unit configured to form an external output image based on a read image in the image reading unit of the automatic document feeding device; and a controller configured to rotate the common rotation output shaft in the reverse rotation direction beyond the set reverse rotation angle and relatively move the image reading unit and the color reference member, when a number of times of image formation in the image forming unit reaches a period corresponding to a number of times of shading correction requests set in advance, and to execute the shading correction of the image formed in the image forming unit using the color reference member including the white reference face for the shading correction.

10. An automatic document feeding method, comprising:

conveying a document to an image reading position;

reading an image of the document upon conveyance to the image reading position, via an image reading unit;

regulating, via a movement regulator, a relative movement of the image reading unit and a color reference member via a moving assembly, the color reference member including a white reference face to correct shading and facing the image reading unit;

changing a rotation output shaft of a drive source from a forward rotation direction to a reverse rotation direction to reversely rotate the rotation output shaft to a set reverse rotation angle, set in advance according to a condition of conveyance of the document;

disposing the movement regulator, in a rotation transmission route from the rotation output shaft to the moving assembly, in a first reverse rotation drive region from when a rotation direction of the rotation output shaft is changed to the reverse rotation direction to when a rotation angle of the rotation output shaft after the change in the reverse rotation direction reaches the set reverse rotation angle; and relatively moving, via the moving assembly, the image reading unit and the color reference member in a second reverse rotation drive region where the rotation output shaft is rotated in the reverse rotation direction beyond the set reverse rotation angle.

11. The automatic document feeding method according to claim 10, wherein the movement regulator includes a pair of rotation transmitters relatively rotatable within a delay angle set in advance in the rotation transmission route from the rotation output shaft to the moving assembly, and wherein the automatic document feeding method further comprises:

delaying a moving assembly operation to relatively move the image reading unit and the color reference member to positions where the image reading unit and the color reference member are used to correct shading, by relative rotation of the pair of rotation transmitters, from when the rotation direction of the rotation output shaft is changed to the reverse rotation direction to when the rotation output shaft reaches the second reverse rotation drive region.

12. The automatic document feeding method according to claim 11, wherein the movement regulator includes a collar member relatively rotatable within the delay angle with respect to one rotation transmitter of the pair of rotation transmitters disposed at a side of the rotation output shaft, and wherein the automatic document feeding method further comprises:

engaging, via the collar member, the other rotation transmitter of the pair of rotation transmitters disposed at a side of the moving assembly, to allow rotation transmission only in the reverse rotation direction.

13. The automatic document feeding method according to claim 10, further comprising:

raising a call roller, via an elevation assembly configured to respectively lower or raise the call roller to respectively approach or separate from a document mount surface of a document mount table via a respective forward rotation of the rotation output shaft in the forward rotation direction or via a respective reverse rotation of the rotation output shaft in the reverse rotation direction, to a stand-by position above a document mount table, disposed upstream from the conveyance unit in a direction of conveyance of the document, from when the drive source changes the rotation direction of the rotation output shaft to the reverse rotation direction to when the rotation angle of the rotation output shaft in the reverse rotation direction reaches the set reverse rotation angle, the call roller being configured to call the document on the document mount table to the conveyance unit.

* * * * *